United States Patent
Akahori et al.

(10) Patent No.: US 7,436,916 B2
(45) Date of Patent: Oct. 14, 2008

(54) PULSE MODULATOR AND PPM DEMODULATION DETERMINING CIRCUIT EMPLOYED IN ULTRA WIDEBAND WIRELESS COMMUNICATIONS

(75) Inventors: Hiroji Akahori, Tokyo (JP); Yoshihito Shimazaki, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 644 days.

(21) Appl. No.: 11/006,813

(22) Filed: Dec. 8, 2004

(65) Prior Publication Data
US 2005/0141605 A1    Jun. 30, 2005

(30) Foreign Application Priority Data
Dec. 8, 2003 (JP) .................... 2003-408836
Jun. 17, 2004 (JP) .................... 2004-179745

(51) Int. Cl.
*H03K 7/02* (2006.01)
*H03K 9/02* (2006.01)

(52) U.S. Cl. .............. 375/353; 375/340; 375/296; 375/297; 375/130

(58) Field of Classification Search ............. 375/296, 375/130, 259, 297, 353, 340; 330/52, 151; 455/3.02
See application file for complete search history.

(56) References Cited

U.S. PATENT DOCUMENTS

| 5,808,512 | A  | * | 9/1998 | Bainvoll et al. | 330/151 |
| 6,700,441 | B1 | * | 3/2004 | Zhang et al. | 330/52 |
| 6,711,216 | B2 | * | 3/2004 | Hannah | 375/296 |
| 2005/0095980 | A1 | * | 5/2005 | Chang | 455/3.02 |

FOREIGN PATENT DOCUMENTS

| JP | 64-65574 | 3/1989 |
| JP | 9-270733 | 10/1997 |

OTHER PUBLICATIONS

"Nikkei Electronics" Nikkei Business Publications, Inc., No. 841, pp. 108-109, Feb. 17, 2003.

* cited by examiner

*Primary Examiner*—Phuong Phu
(74) *Attorney, Agent, or Firm*—Studebaker & Brackett PC; Donald R. Studebaker

(57) ABSTRACT

The present invention provides a pulse modulator and a PPM demodulation determining circuit employed in Ultra Wideband (UWB) wireless communications. The pulse modulator comprises high frequency delayers which delay an input pulse, variable gainers each of which amplifies the delayed pulse, and an adder which adds the amplified pulses. The PPM demodulation determining circuit comprises an absolute value converter which absolute value-converts a received signal, integration circuits which individually integrate the absolute value-converted signals, and a comparison/determination unit which compares the integrated signals.

2 Claims, 23 Drawing Sheets

PULSE MODULATOR AND PPM DEMODULATION DETERMINING CIRCUIT EMPLOYED IN ULTRA WIDEBAND WIRELESS COMMUNICATIONS

BACKGROUND OF THE INVENTION

1. Field of the Invention

The present invention relates to a pulse modulator capable of generating a transmission pulse having an arbitrary shape in ultra wideband (hereinafter abbreviated as "UWB") wireless communications.

The present invention also relates to a demodulation determining circuit which performs demodulation on the basis of a modulated pulse subjected to pulse position modulation (hereinafter abbreviated as "PPM") on the transmitting side in UWB wireless communications.

2. Description of the Related Art

In a conventional wireless communication system or a UWB wireless communication system using a related art, transmission output frequency characteristics such as an occupied bandwidth, etc. are determined which are proportional to the rate of a transmission code or a diffusion code. This is done to attenuate frequency components of the transmission code or diffusion code by a band limit filter (see a patent document 1 (Japanese Unexamined Patent Publication No. Hei 10(1998)-65574) or 2 (Japanese Unexamined Patent Publication No. Hei 9(1997)-270733)). In the conventional wireless communications, communications are carried out using such a modulation signal.

In the conventional wireless communication system or the UWB wireless communication system using the related art, a carrier frequency is multiplied by a modulation component on the transmitting side to obtain a transmission output. On the receiving side, a frequency equivalent to the carrier frequency on the transmitting side is multiplied by a received input to extract the modulation component (refer to, for example, a non-patent document 1 ("Nikkei Electronics", Nikkei Business Publications, Inc., Feb. 17, 2003, No. 841, pp. 108-109)).

In the UWB wireless communications, a method of bringing a transmit output waveform into pulsed form has been discussed to effectively use a communication band and ensure transmission power. Accordingly, the frequency characteristic is decided based on a pulse per se corresponding to one transmission output unit without the frequency characteristic being determined by the rate of the conventional transmission code or diffusion code or the like.

Therefore, there is a need to provide a mechanism for generating a pulse shape corresponding to a transmission code or diffusion code without causing the conventional transmission code or diffusion code to directly pass through the band limit filter, as a problem on the transmitting side. The conventional modulation circuit is not capable of generating such a pulsated signal.

On the other hand, there is known, as a problem on the receiving side, demodulation of a pulse position modulation system corresponding to a typical modulation system for UWB wireless communications, which shifts the generated position of a pulse according to information sources to thereby perform modulation. It is also feasible to take a pulse corresponding to a transmission output as electric power in the case of pulse position modulation and determine data according to whether the power is placed in a desired position. In the case of adoption of the conventional reception system, however, a received input is multiplied by a frequency equivalent to a carrier frequency on the receiving side to thereby make conversion into a baseband signal, and signal demodulation is carried out by a high resolution sampling-based processing system for determining a pulse or a Rake reception system which absorbs a time delay of an incoming wave due to a multipath, thereby bringing about a receiving device large in circuit scale.

SUMMARY OF THE INVENTION

The present invention aims to solve the drawbacks of such related arts and provide a pulse modulator capable of generating an output pulse having an arbitrary shape and a PPM demodulation determining circuit which receives a pulse position-modulated signal and demodulates it without increasing a circuit scale thereof, both of which are suitable for use in UWB wireless communications.

According to one aspect of the present invention, for achieving the above object, there is provided a pulse modulator on the transmitting side, comprising at least one or more delay means connected in series, which delay an input pulse by delay characteristics provided over a Ultra Wideband (UWB) pass bandwidth, amplifying means which amplify output pulses of the respective delay means by variable gains, and adding means which adds the output pulses of the respective amplifying means and outputs the result of addition therefrom, whereby an arbitrary pulse waveform is generated.

According to another aspect of the present invention, for achieving the above object, there is provided a PPM demodulation determining circuit which receives a signal subjected to pulse position modulation, comprising absolute value converting means which absolute value-converts the received signal, at least one or more integrating means connected in parallel, which integrate an output signal of the absolute value converting means over individual integration times and demodulate the same, and comparing/determining means which compares the output signals of the respective integrating means and determines whether the pulse position-modulated signal exists in any output signal.

According to the present invention, it is possible to generate an arbitrary pulse waveform corresponding to a transmission code or diffusion code indicative of an input signal on the transmitting side of UWB wireless communications.

According to the present invention, when a pulse modulated using PPM is received on the receiving side of UWB wireless communications, there is no need to provide, on the conventional receiving side, a local oscillator corresponding to a frequency circuit that provides a frequency equivalent to a carrier frequency, and a mixer corresponding to a circuit which multiplies the frequency of the pulse by its frequency. A high resolution sampling process for determining the pulse is unnecessary too. Further, a Rake reception configuration which absorbs a time delay of an incoming wave due to a multipath, becomes also unnecessary.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Figure 1:
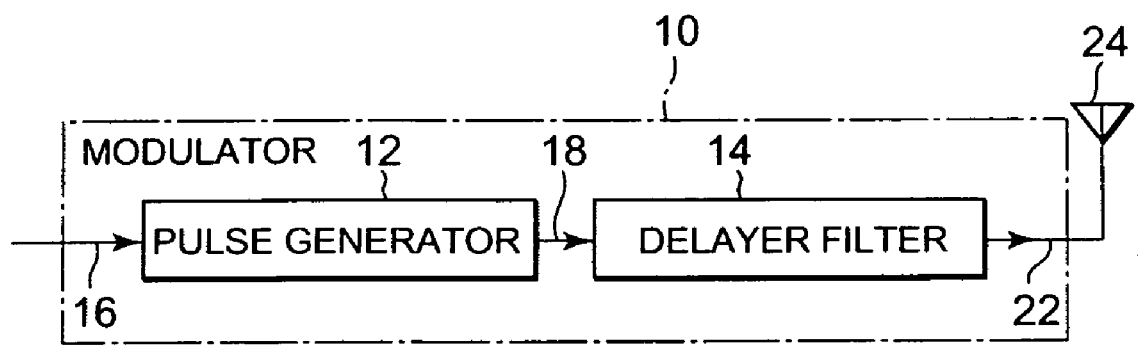
FIG. 1 is a block diagram showing a first embodiment of a pulse modulator according to the present invention.

Preferred embodiments of pulse modulators and PPM demodulation determining circuits according to the present invention will next be explained in detail with reference to the accompanying drawings. Elements directly unrelated to the present invention are omitted below and like elements are given like reference numerals. Also signals are respectively identified by symbols of signal lines at which they appear.

Embodiments of pulse modulators according to the present invention will first be described. FIG. 1 is a block diagram showing a first embodiment of a modulator using at least one delayer. The modulator 10 comprises a pulse generator 12 and a delayer filter 14. The pulse generator 12 receives a transmission code or diffusion code 16 as a baseband signal to be transmitted and generates a pulse 18 having a time width of about 1 ps (picosecond). Since an extremely wide range of frequency components are contained in the pulse wave, the pulse wave takes up an extremely broad band like a width of a few GHz as viewed on a frequency axis. In ultra wideband (UWB) wireless communications, the position, waveform and phase of the pulse wave on the time base thereof are changed to add information. The delayer filter 14 receives the pulse 18 outputted from the pulse generator 12 and outputs a pulse 22 having an arbitrary shape. That is, the process of adding the information is carried out by the delayer filter 14. The pulse 22 having the arbitrary shape is transmitted through an antenna 24.

Figure 2:
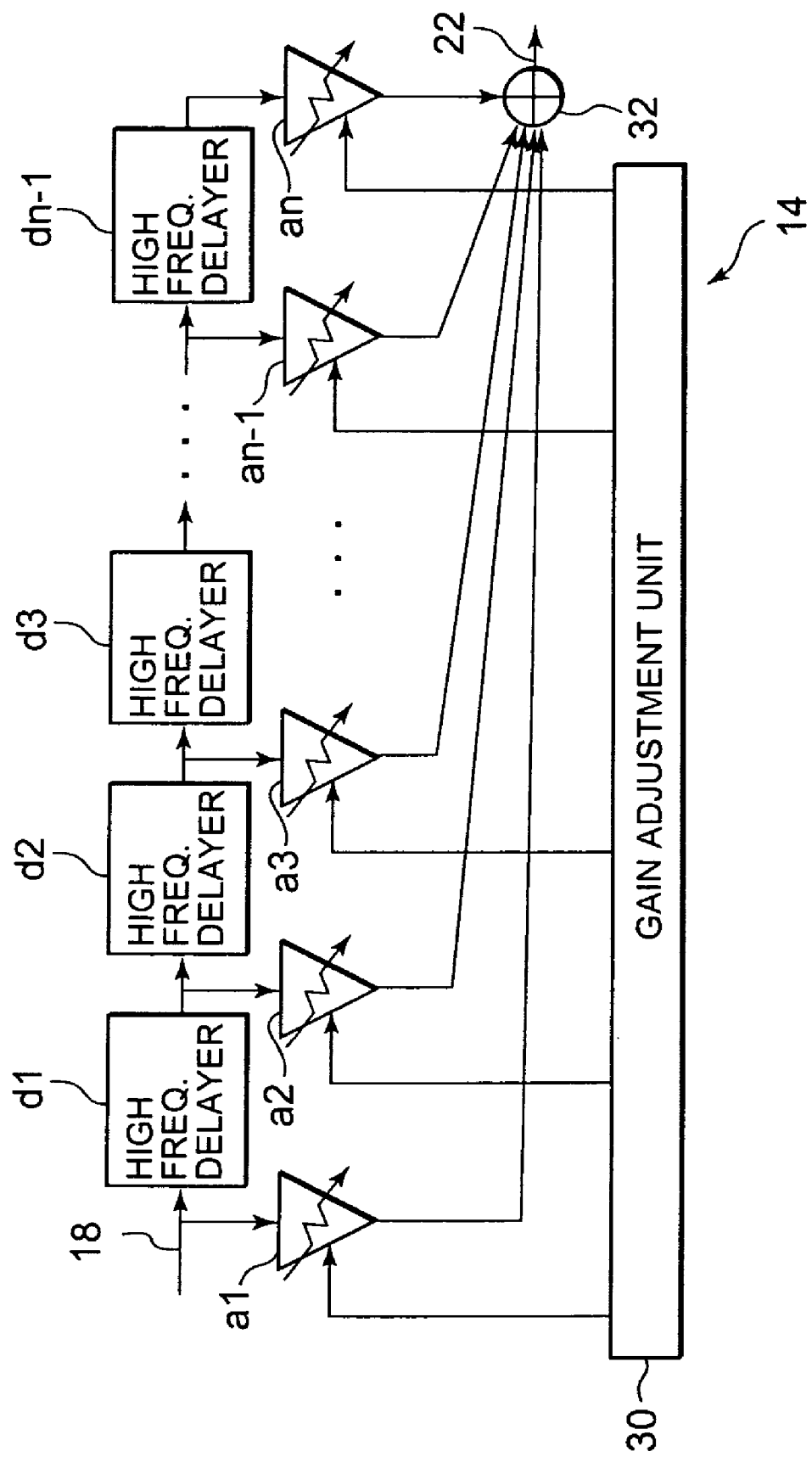
FIG. 2 is a block diagram illustrating an embodiment of a delayer filter shown in FIG. 1.

FIG. 2 is a block diagram showing a first embodiment of the delayer filter shown in FIG. 1. The delayer filter 14 includes one or more high frequency delayers d1 through dn−1 (where n: whole number greater than or equal to 2), i.e., n−1 high frequency delayers, which are connected in series. The high frequency delayers d1 through dn−1 respectively receive the pulse 18 outputted from the pulse generator 12 as an input. The high frequency delayers d1 through dn−1 are respectively analog circuits which have delay characteristics over a UWB pass bandwidth. The UWB pass bandwidth may be set to, for example, a frequency band less than or equal to 1 GHz or between 3 GHz and 10 GHz. As already mentioned above, the pulse 18 takes up the extremely broad band of few GHz width and is sequentially delayed by the high frequency delayers d1 through dn−1.

The delayer filter 14 includes n programmable or variable gainers a1 through an (where n: whole number greater than or equal to 2) connected to their corresponding input/output terminals of the n−1 high frequency delayers d1 through dn−1 connected in series. The variable gainers a1 through an respectively amplify received signals in accordance with gain values variably set thereto. The delayer filter 14 includes a gain adjustment unit 30 which individually set gain values to the n variable gainers a1 through an. Also the delayer filter 14 includes an adder 32 which is connected to output terminals of the n variable gainers a1 through an and which adds pulses outputted from the variable gainers a1 through an and outputs the result of addition therefrom.

A description will now be made of the conditions that the delayed times of the pulse 18 by the delayers d1 through dn−1 should meet. Even if the delay times do not satisfy the following conditions, the effect of the present embodiment is obtained in some measure. It is however desired that the delay times meet the following conditions 1 and 2 to obtain a sufficient effect.

Condition 1: The delay times of the signal, which are obtained by the respective delayers d1 through dn−1, are defined as delay times developed between the inputs to the respective delayers and the output 22 of the adder in consideration of even time delays taken up to the output 22 of the adder through the variable gainers a1 through an as viewed from the outputs of the delayers. The delay times are assumed to be substantially constant. That is, the lengths of connecting lines from the respective delayers d1 through dn−1 to the adder 32 are adjusted in such a way that the delay times become constant.

Condition 2: The constant delay times are assumed to be less than one-half the time width of a pulse having the highest frequency in a used UWB communication frequency band.

Figure 3:
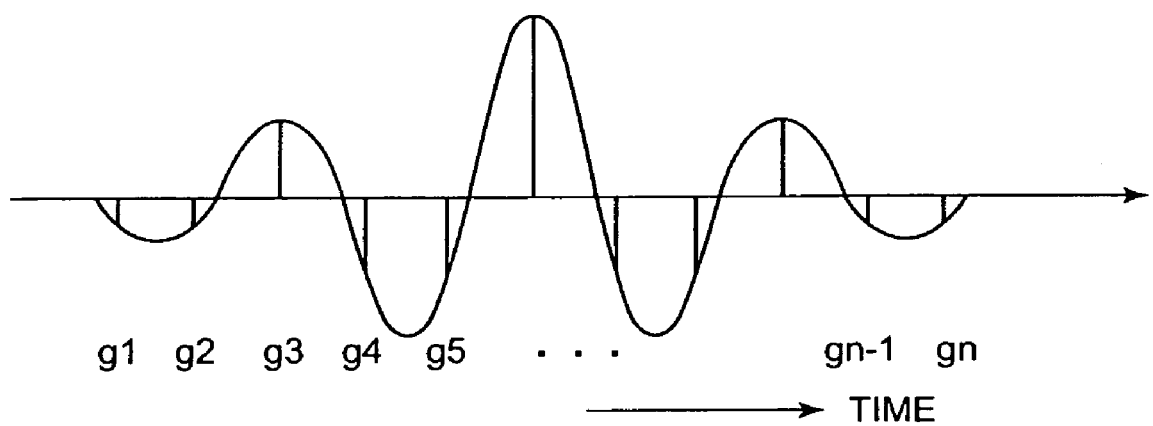
FIG. 3 is an example illustrative of gain values respectively set to variable gainers by a gain adjustment unit shown in FIG. 2.

FIG. 3 is an example illustrative of gain values respectively set to the variable gainers a1 through an by the gain adjustment unit 30 shown in FIG. 2. Gain values g1 through gn are respectively set to the variable gainers a1 through an. As illustrated in FIG. 3, each of the gain values set to the variable gainers a1 through an of the delayer filter 14 may preferably be set to a value close to a desired impulse response characteristic. Adjusting the gain values arbitrarily in this way yields a pulse 22 having an arbitrary waveform.

Figure 4:
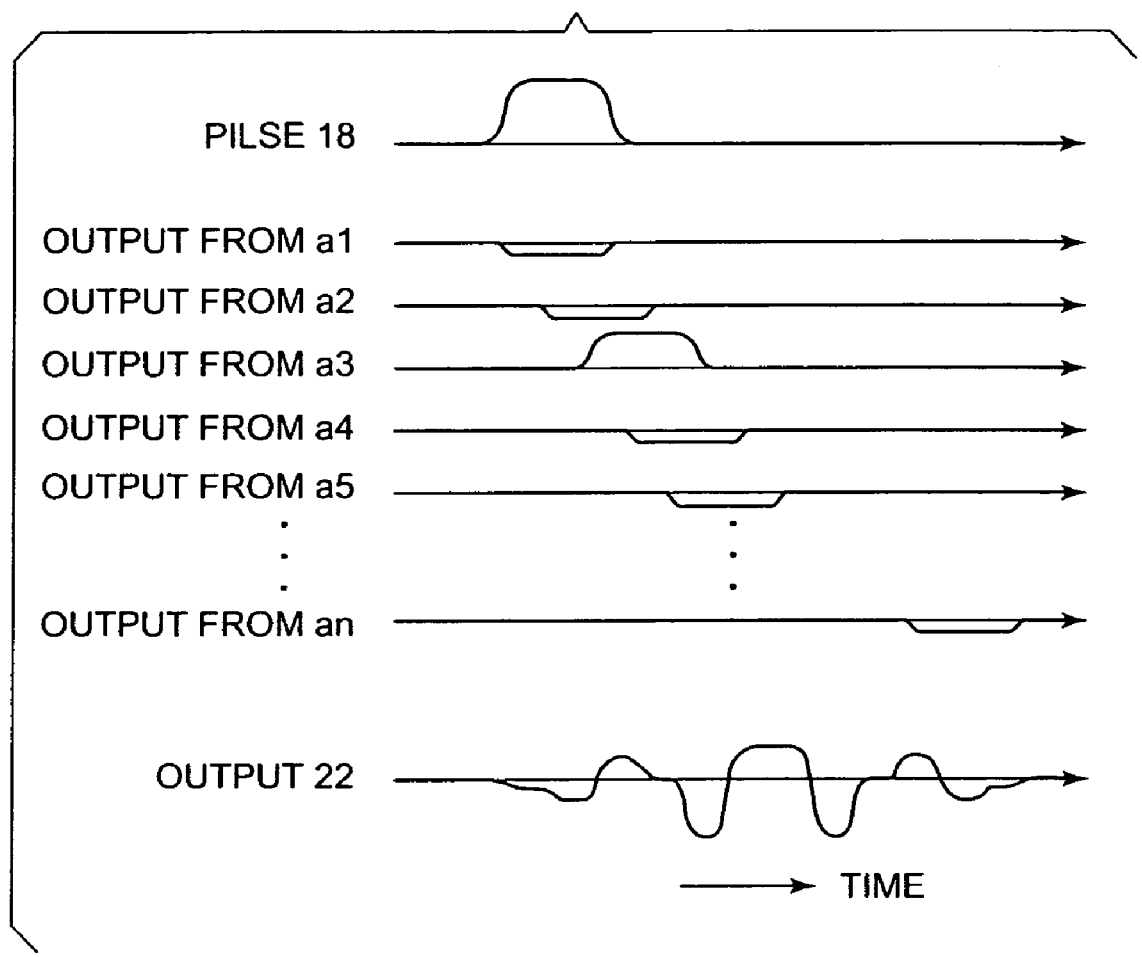
FIG. 4 is an example illustrative of input/output signals of the delayer filter shown in FIG. 2.

The embodiment of the pulse modulator according to the present invention, which has the above configuration, is operated as follows. FIG. 4 is an example illustrative of input/output signals of the delayer filter shown in FIG. 2. When the input signal 18 is of a pulse shown in FIG. 4, the pulse is sequentially delayed substantially by a constant time interval by the respective delayers d1 through dn−1. The sequentially delayed pulses are respectively amplified by their corresponding gain values g1 through gn set to the variable gainers a1 through an. As a result, the outputs of the variable gainers a1 through an are represented as shown in FIG. 4. Then, the n outputs from the variable gainers a1 through an are all added together by the adder 32, so that such an output signal 22 as shown in FIG. 4 is brought about. Thus, an output signal formed by adding a desired impulse response characteristic to the input signal is obtained.

It is actually difficult to bring pass frequency characteristics of the delayers d1 through dn−1 to an ideal uniform state respectively. Therefore, it is assumed that the delay times are different depending on passing frequency components and waveforms are distorted insofar as the outputs from the variable gainers, having passed through the delayers in plenty are concerned. Therefore, the gain values given to the variable gainers a1 through an may preferably be set to values that have taken into consideration the fact that the delay times vary according to the frequency components. Described specifically, it is preferable to prepare the function of correcting the gain values for the gain adjustment unit 30 shown in FIG. 2 in advance and correct the gain values of the variable gainers a1 through an. Thus, the gain values g1 through gn based on the predetermined impulse response characteristics and adjustments to the gain values by the gain adjustment unit 30 are combined, thereby making it possible to generate a pulse waveform corresponding to a transmission code or diffusion code corresponding to the input signal.

Figure 5:
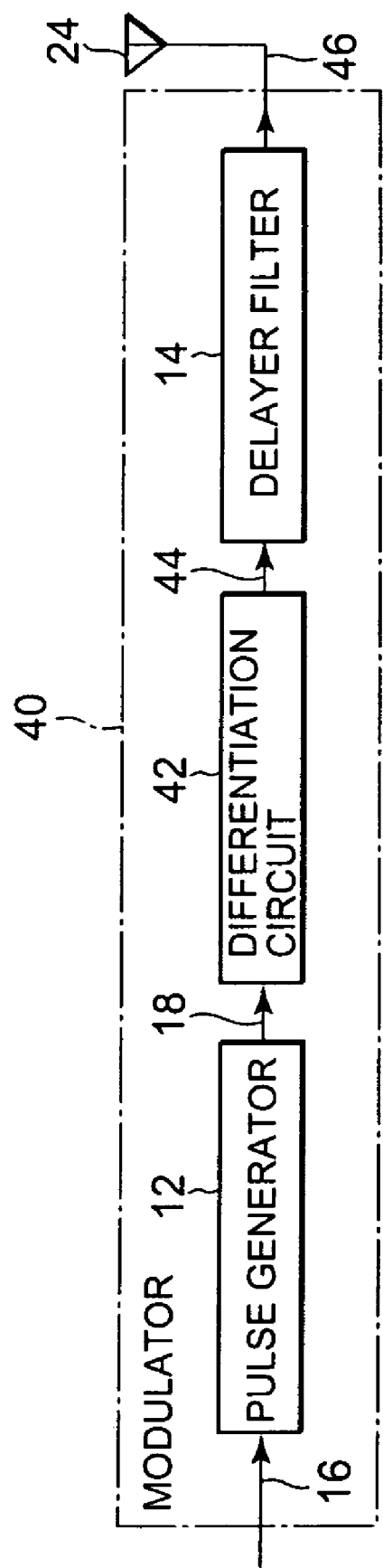
FIG. 5 is a block diagram showing a second embodiment of a pulse modulator according to the present invention.

FIG. 5 is a block diagram showing a second embodiment of a modulator using at least one delayer, according to the present invention. The modulator 40 shown in FIG. 5 is different from the modulator 10 shown in FIG. 1 in that a differentiation circuit 42 is provided between a pulse generator 12 and a delayer filter 14. The pulse generator 12 and the delayer filter 14 are identical in configuration to those shown in FIG. 1.

Figure 6:
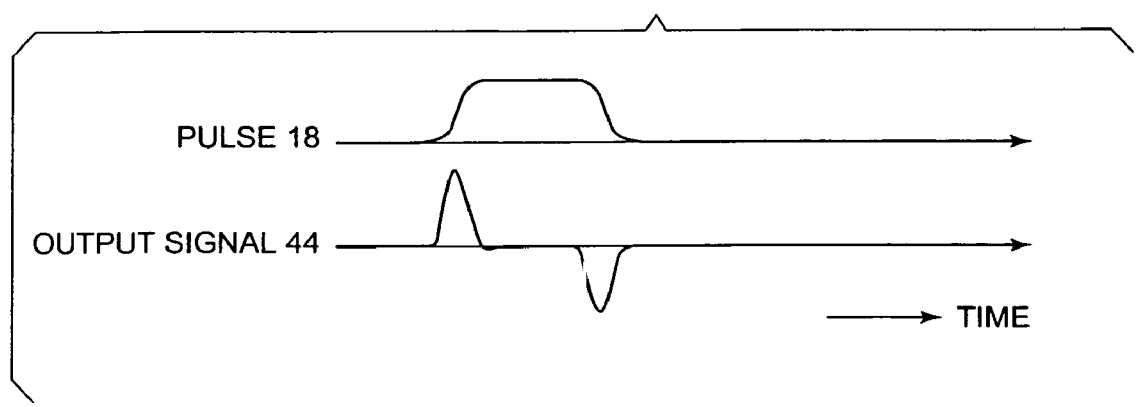
FIG. 6 is an example illustrative of input/output signals of a differentiation circuit shown in FIG. 5.

The differentiation circuit 42 is an analog circuit which differentiates a pulse 18 outputted from the pulse generator 12 to change its waveform. The differentiation circuit 42 is capable of extracting only a deviation in the output of the pulse generator 12. FIG. 6 is an example illustrative of input/output signals of the differentiation circuit shown in FIG. 5. When an input signal 18 is inputted to the differentiation circuit 42 as shown in FIG. 6, an output signal 44 indicative of a differential curve is outputted from the differentiation circuit 42. Thereafter, the delayer filter 24 effects modulation on the resultant differential curve 44. That is, the differential curve 44 is brought into sequentially delayed n signals, which are respectively amplified with predetermined gain values, followed by being added together. Thus, a pulse waveform 46 corresponding to a transmission code or diffusion code 16 equivalent to the input signal is generated.

Figure 7:
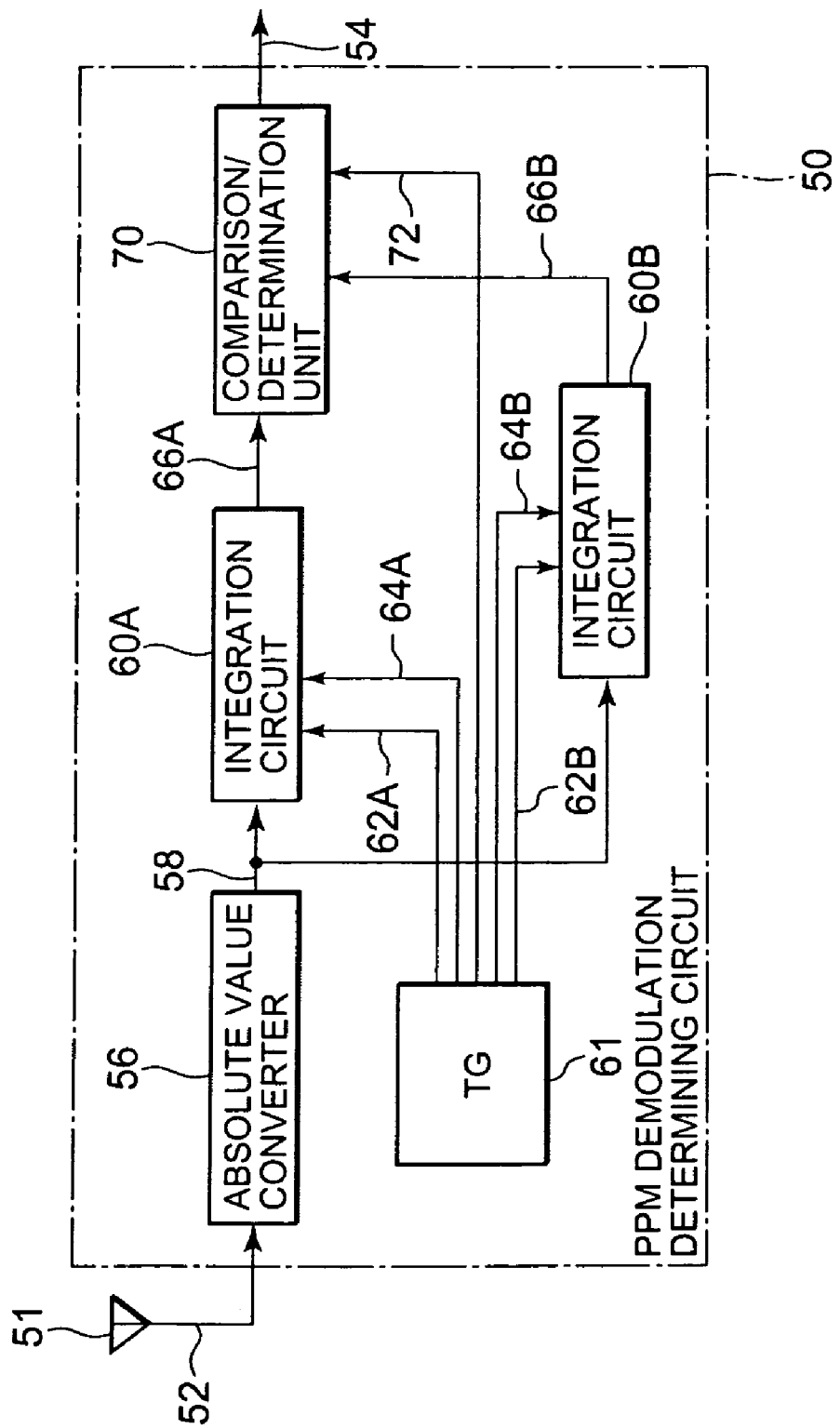
FIG. 7 is a block diagram showing a first embodiment of a PPM demodulation determining circuit according to the present invention.

Embodiments of PPM demodulation determining circuits according to the present invention will next be described. FIG. 7 is a block diagram showing a first embodiment of a PPM demodulation determining circuit according to the present invention. The PPM demodulation determining circuit 50 is a circuit which receives an input signal 52 modulated with PPM (Pulse Position Modulation) in a transmitting station and inputted via an antenna 51 and which outputs it as demodulated data 54. The PPM demodulation determining circuit 50 includes an absolute value converter 56 which converts the input signal 52 into an absolute value 58.

Figure 8:
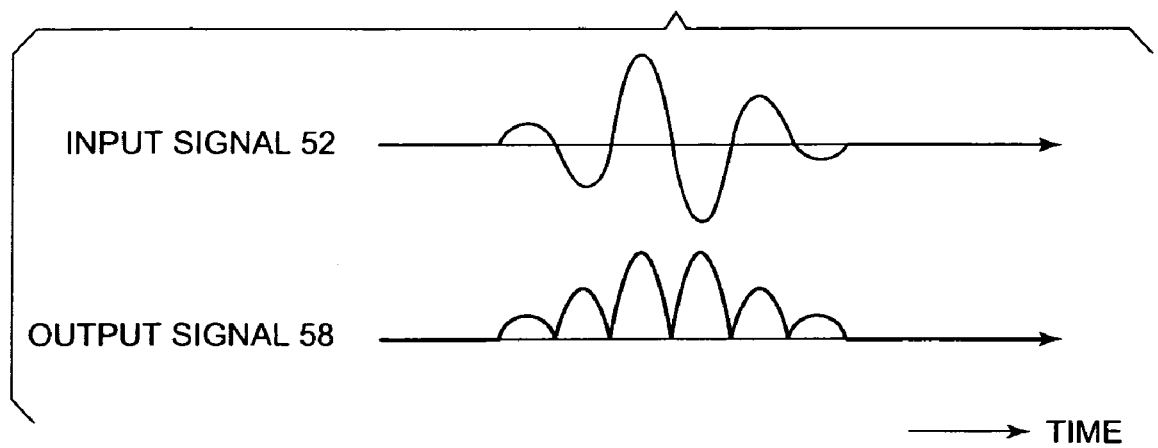
FIG. 8 is an example illustrative of input/output signals of an absolute value converter shown in FIG. 7.

FIG. 8 is an example illustrative of input/output signals of the absolute value converter 56 shown in FIG. 7. The absolute value conversion intends to convert the negative polarity of the input signal 52 to the positive polarity to make conversion into an output signal 58. When a fixed threshold value is contained inside the absolute value converter 56 in advance, the absolute value conversion is performed with the given threshold value regarded as a zero level. That is, the input signal and the threshold value are compared, and input signal components that come to amplitude values below the threshold value are inverted to provide an output signal.

The PPM demodulation determining circuit 50 shown in FIG. 7 includes two integration circuits 60A and 60B connected in parallel. Incidentally, the number of integration circuits may be three or more. Each of the integration circuits 60A and 60B integrates the absolute value-converted output signal 58 with respect to individual integration times and demodulates the same. Also the PPM demodulation determining circuit 50 includes a timing generator 61. The timing generator 61 is capable of supplying integration time control signals 62A and 62B to the integration circuits 60A and 60B respectively and individually determining the integration times required to perform integration within the absolute value-converted signal 58. Further, the timing generator 61 is capable of supplying discharge control signals 64A and 64B to the integration circuits 60A and 60B respectively and individually determining discharge times required to discharge signal components obtained by integration.

Also the PPM demodulation determining circuit 50 includes a comparison/determination unit 70 which compares signals 66A and 66B outputted from the integration circuits 60A and 60B and outputs demodulated data 54 according to which values of output signals are large. The comparison/determination unit 70 compares the amplitudes of the output signals 66A and 66B between the completion of integration in a predetermined integration period of time within the output signals 66A and 66B of the integration circuits 60A and 60B and the start of discharge of integrated values in a predetermined discharge period of time. Thus, a decision is made as to in which integration time the pulse position-modulated signal exists. Timing for comparison is supplied from the timing generator 61 to the comparison/determination unit 70 through a decision timing signal 72.

Figure 9:
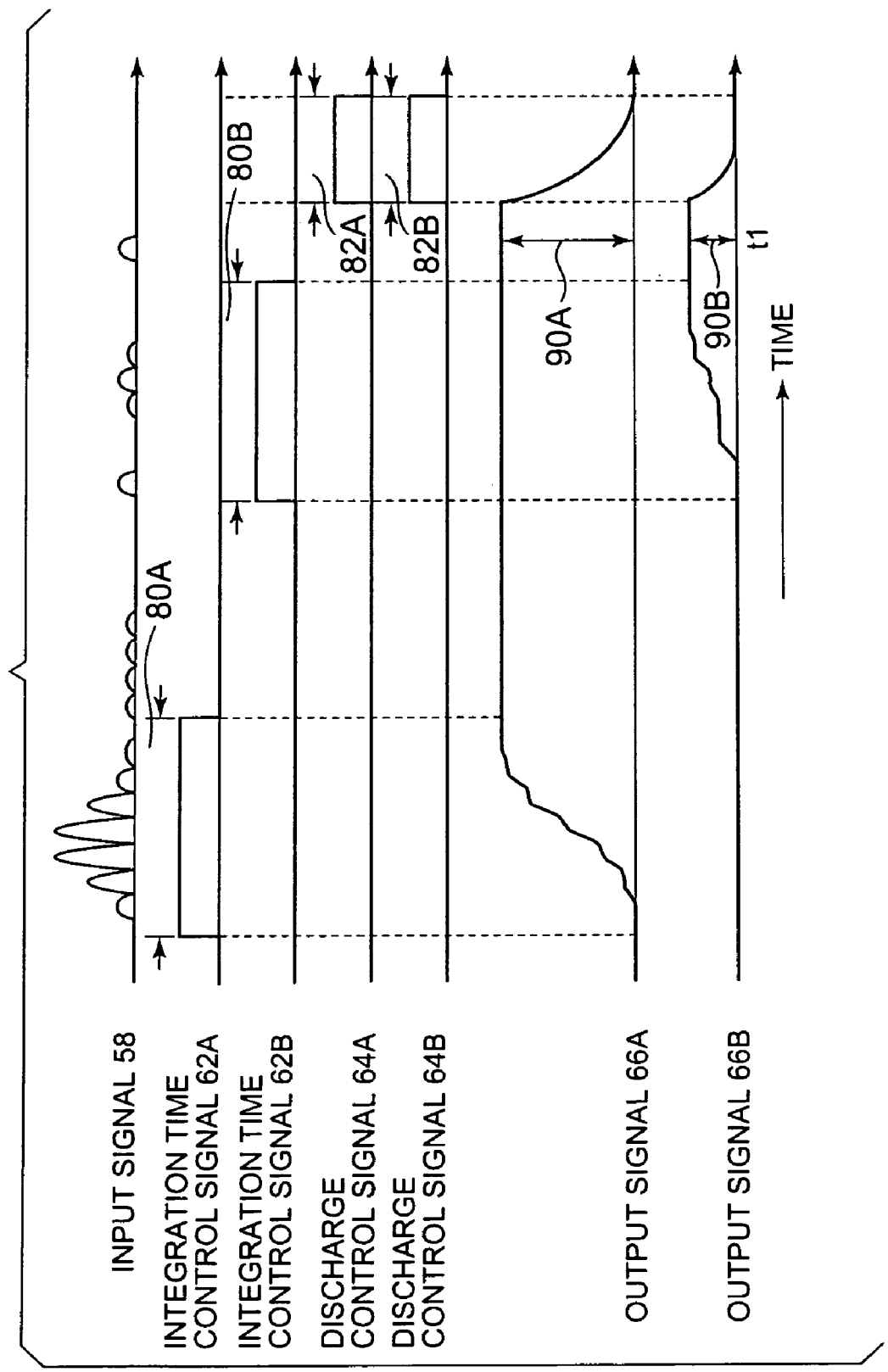
FIG. 9 is an example illustrative of input/output signals of an integration circuit shown in FIG. 7.

The embodiment of the PPM demodulation determining circuit according to the present invention, which has the above configuration, is operated as follows. FIG. 9 is an example illustrative of input/output signals of the integration circuits shown in FIG. 7. As shown in FIG. 9, the integration circuits 60A and 60B respectively integrate the input signal 58 only during integration times 80A and 80B determined by the integration time control signals 62A and 62B respectively supplied thereto. The integration circuits 60A and 60B discharge the integrated signal components only during the discharge times 82A and 82B determined by their corresponding discharge control signals 64A and 64B. FIG. 9 shows a case in which the integration times 80A and 80B are set as discrete time positions and the discharge times 82A and 82B are set as the same time position.

Since the input signal 58 is one subjected to the absolute value conversion, it has an amplitude having a certain one polarity alone. With integration of such an input signal 58, there is no occurrence of a reduction in integrated value due to the input of negative polarity components. In other words, since the amplitude of one polarity alone is provided even if a frequency component having a wavelength shorter than an integration time length is integrated, the cancellation of positive and negative polarities of the original frequency component with respect to each other do not occur, so that the amplitude can be extracted as the integrated value. Thus, when a pulse modulated using PPM in UWB wireless communications is received, there is no need to provide, on the conventional receiving side, a local oscillator corresponding to a frequency circuit that provides a frequency equivalent to a carrier frequency, and a mixer corresponding to a circuit which multiplies the frequency of the pulse by its frequency. A high resolution sampling process for determining the pulse is unnecessary too.

Further, a Rake reception configuration for absorbing a time delay of an incoming wave due to a multipath is also unnecessary. A transmission wave sent out from the transmitting side passes through propagation paths that differ according to propagation circumstances and reaches the receiving side, thus resulting in a received signal obtained by overlapping signals having different delay times each other. The Rake reception has heretofore been performed wherein these plural delay times are estimated, received signals are correlated in several respectively and their respective correlated values are effectively combined, thereby improving a reception characteristic. However, the embodiment of the present invention makes unnecessary a complex circuit configuration like the Rake reception because even if any signals having delay times overlap one another during the integration time, they are all absolute-value converted into the positive polarity, followed by being integrated.

When the output signals 66A and 66B of the integration circuits 60A and 60B shown in FIG. 9 are obtained, the comparison/determination unit 70 compares the amplitudes of the output signals 66A and 66B before the discharge times 82A and 82B are started after the end of the integration times 80A and 80B. With their comparison, a decision is made as to in which integration time the pulse signal exists. A timing t1 for amplitude comparison is supplied to the comparison/determination unit 70 by the decision timing signal 72. The comparison/determination unit 70 compares and determines the amplitudes 90A and 90B of the output signals 66A and 66B shown in FIG. 9.

Figure 10:
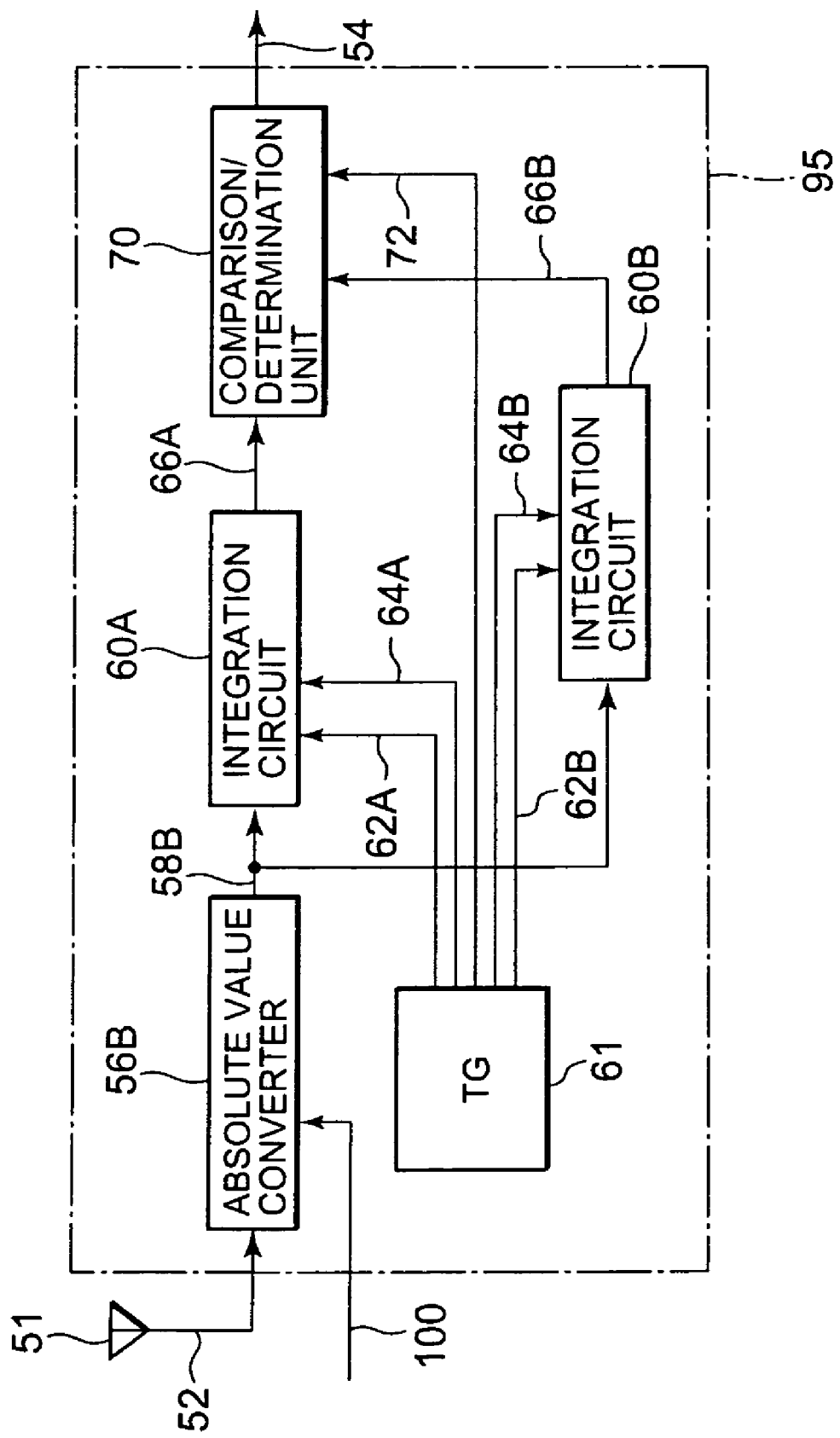
FIG. 10 is a block diagram showing a second embodiment of a PPM demodulation determining circuit according to the present invention.

FIG. 10 is a block diagram showing a second embodiment of a PPM demodulation determining circuit according to the present invention. The PPM demodulation determining circuit 95 shown in FIG. 10 is different from the first embodiment shown in FIG. 7 only in that a threshold signal 100 is supplied to an absolute value converter 56B. The present embodiment is similar in other configuration to the first embodiment. The threshold signal 100 is one for supplying a threshold value for folding back an input signal existing in the negative-polarity side into the positive-polarity side with a predetermined threshold value as the center to the absolute value converter 56B.

Figure 11:
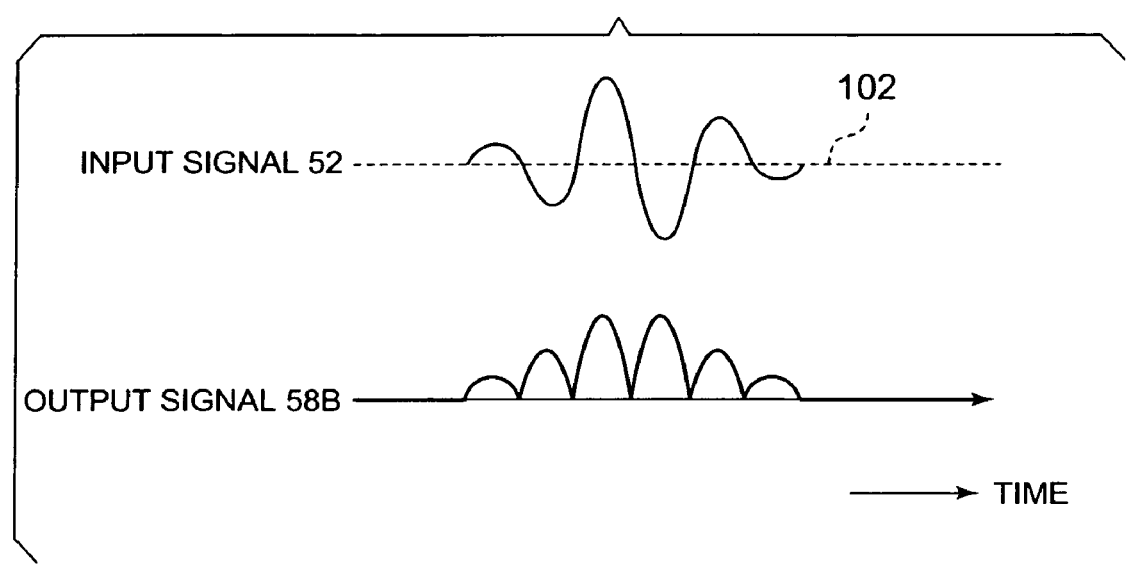
FIG. 11 is an example illustrative of input/output signals of an absolute value converter shown in FIG. 10.

FIG. 11 is an example illustrative of input/output signals of the absolute value converter 56B using the threshold signal shown in FIG. 10. The absolute value conversion of the absolute value converter 56B shown in FIG. 10 intends to fold back the difference in amplitude of an input signal 52 into a polarity in one direction with a threshold level 102 determined by the threshold signal 100 as the center and thereby provide an output signal 58B. The absolute value conversion intends to perform behavior similar to absolute value conversion with the threshold level 102 as the reference even though a center level value of the input signal 52 is not zero.

Since the embodiment shown in FIG. 10 is similar to the embodiment shown in FIG. 7 in configuration and operation except for the supply of the threshold signal 100, the description thereof will be omitted.

Figure 12:
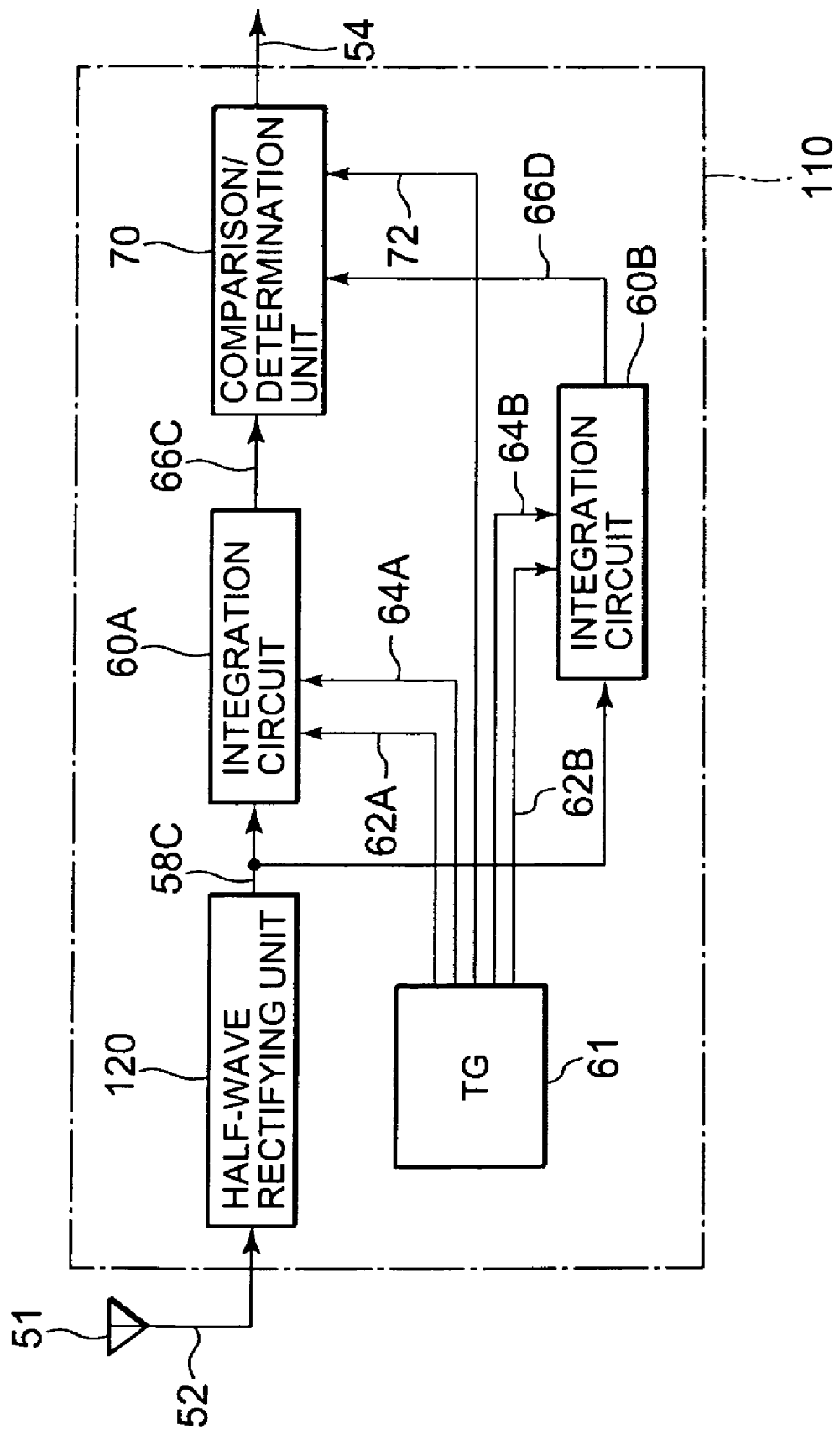
FIG. 12 is a block diagram showing a third embodiment of a PPM demodulation determining circuit according to the present invention.

FIG. 12 is a block diagram showing a third embodiment of a PPM demodulation determining circuit according to the present invention. The PPM demodulation determining circuit 110 shown in FIG. 12 is different from the first embodiment shown in FIG. 7 only in that a half-wave rectifying unit 120 is provided in place of the absolute value converter 56. The present embodiment is similar in other configuration to the first embodiment. The half-wave rectifying unit 120 half-wave rectifies an input signal 52. That is, the half-wave rectifying unit 120 outputs only each component of one polarity. Alternatively, although not illustrated in FIG. 12, a threshold signal is supplied to the half-wave rectifying unit 120 from which an input signal component greater than or equal to a threshold value or less than or equal thereto may be outputted. In such a case, half-wave rectification is carried out with the supplied threshold value being regarded as a zero level.

Figure 13:
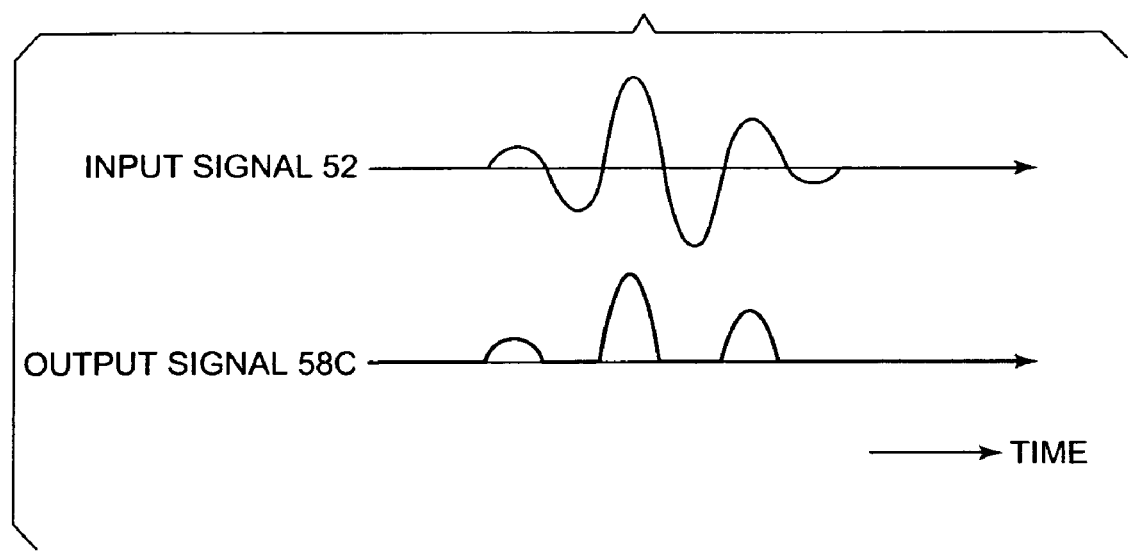
FIG. 13 is an example illustrative of input/output signals of a half-wave rectifying unit shown in FIG. 12.

FIG. 13 is an example illustrative of input/output signals of the half-wave rectifying unit 120 shown in FIG. 12. One obtained by eliminating signal components whose level values are below zero, out of an input signal 52, is outputted as an output signal 58C.

In the embodiment shown in FIG. 12, the signal half-wave rectified in this way is integrated so as to be obtained as output signals 66C and 66D. Since the present embodiment is similar to the embodiment shown in FIG. 7 in terms of configurations and operations of a comparison/determination unit 70 and those subsequent thereto, the description thereof will be omitted.

Figure 14:
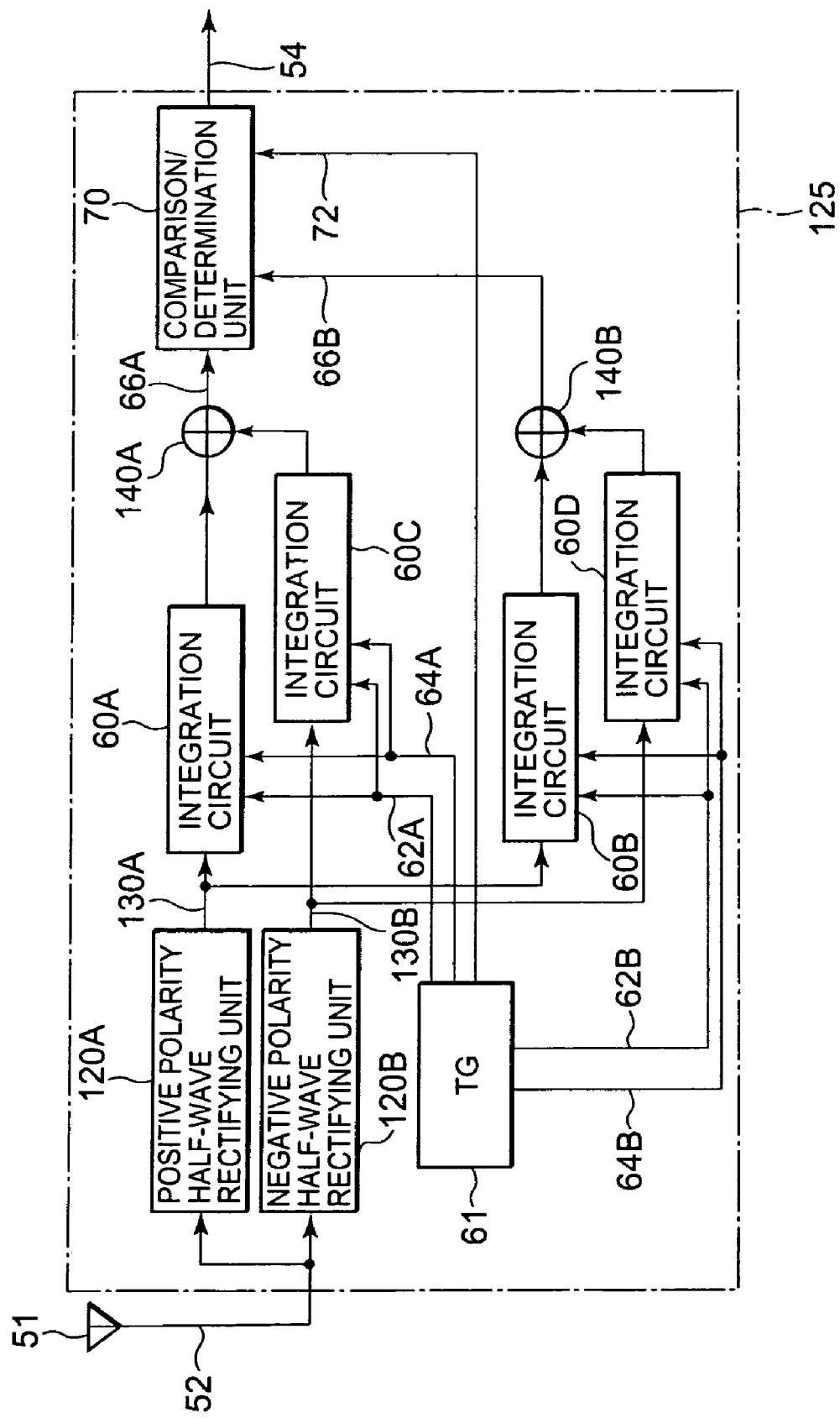
FIG. 14 is a block diagram showing a fourth embodiment of a PPM demodulation determining circuit according to the present invention.

FIG. 14 is a block diagram showing a fourth embodiment of a PPM demodulation determining circuit according to the present invention. Comparing the present embodiment with the third embodiment shown in FIG. 12, the PPM demodulation determining circuit 125 is different from that shown in FIG. 12 in that it has two half-wave rectifying units of a positive polarity half-wave rectifying unit 120A and a negative polarity half-wave rectifying unit 120B. The positive polarity half-wave rectifying unit 120A is a rectifier circuit similar to the half-wave rectifying unit 120 shown in FIG. 12. That is, the positive polarity half-wave rectifying unit 120A outputs only positive polarity components of an input signal 52, or when a threshold signal, although not shown in the drawing, is supplied to the rectifying unit 120A, the positive polarity rectifying unit 120A outputs only positive polarity components with a threshold value being regarded as a zero level. In reverse, the negative polarity half-wave rectifying unit 120B outputs only negative polarity components of the input signal 52, or when a threshold signal is given to the rectifying unit 120A, the negative polarity half-wave rectifying unit 120B outputs only negative polarity components with a threshold value regarded as a zero level. In other words, the negative polarity half-wave rectifying unit 120B effects the normal half-wave rectification on the input signal 52 after its inversion.

Figure 15:
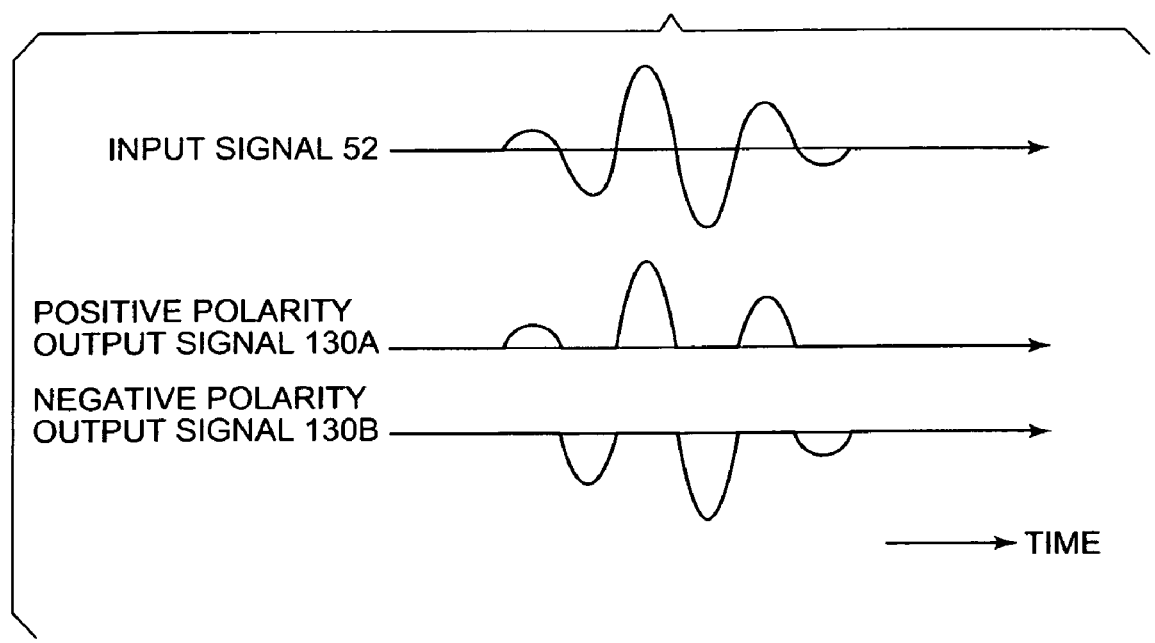
FIG. 15 is an example illustrative of input/output signals of positive polarity/negative polarity half-wave rectifying units shown in FIG. 14.

FIG. 15 is an example illustrative of input/output signals of the positive polarity and negative polarity half-wave rectifying units 120A and 120B shown in FIG. 14. Of the input signal 52, signal components whose level values are above zero, result in an output signal 130A of the positive polarity half-wave rectifying unit 120A, and signal components thereof whose level values are below zero, result in an output signal 130B of the negative polarity half-wave rectifying unit 120B. Incidentally, although the signal 130B appears on the negative polarity side as a signal in FIG. 15, this is for convenience of illustration. Since the input signal 52 is actually inverted and rectified, a similar signal having an absolute value appears on the positive polarity side.

The output signals 130A and 130B produced from the positive polarity and negative polarity rectifying units 120A and 120B are respectively integrated by integration circuits 60A and 60B and 60C and 60D provided two by two, in a manner similar to the third embodiment shown in FIG. 12. The present embodiment is similar to the third embodiment even in that integration time control signals 62A and 62B and discharge control signals 64A and 64B are supplied from a timing generator 61 to these integration circuits.

The PPM demodulation determining circuit 125 further includes an adder 140A which adds signals outputted from the integration circuits 60A and 60C, and an adder 140B which adds signals outputted from the integration circuits 60B and 60D. Thus, those obtained from the adders 140A and 140B shown in FIG. 14 are identical to the output signals 66A and 66B obtained in FIG. 7. Finally-obtained demodulated data 54 becomes identical to one obtained in FIG. 7. Since the present embodiment is similar to the embodiment shown in FIG. 7 in terms of configurations and operations of a comparison/determination unit 70 and those subsequent thereto, the description thereof will be omitted.

Figure 16:
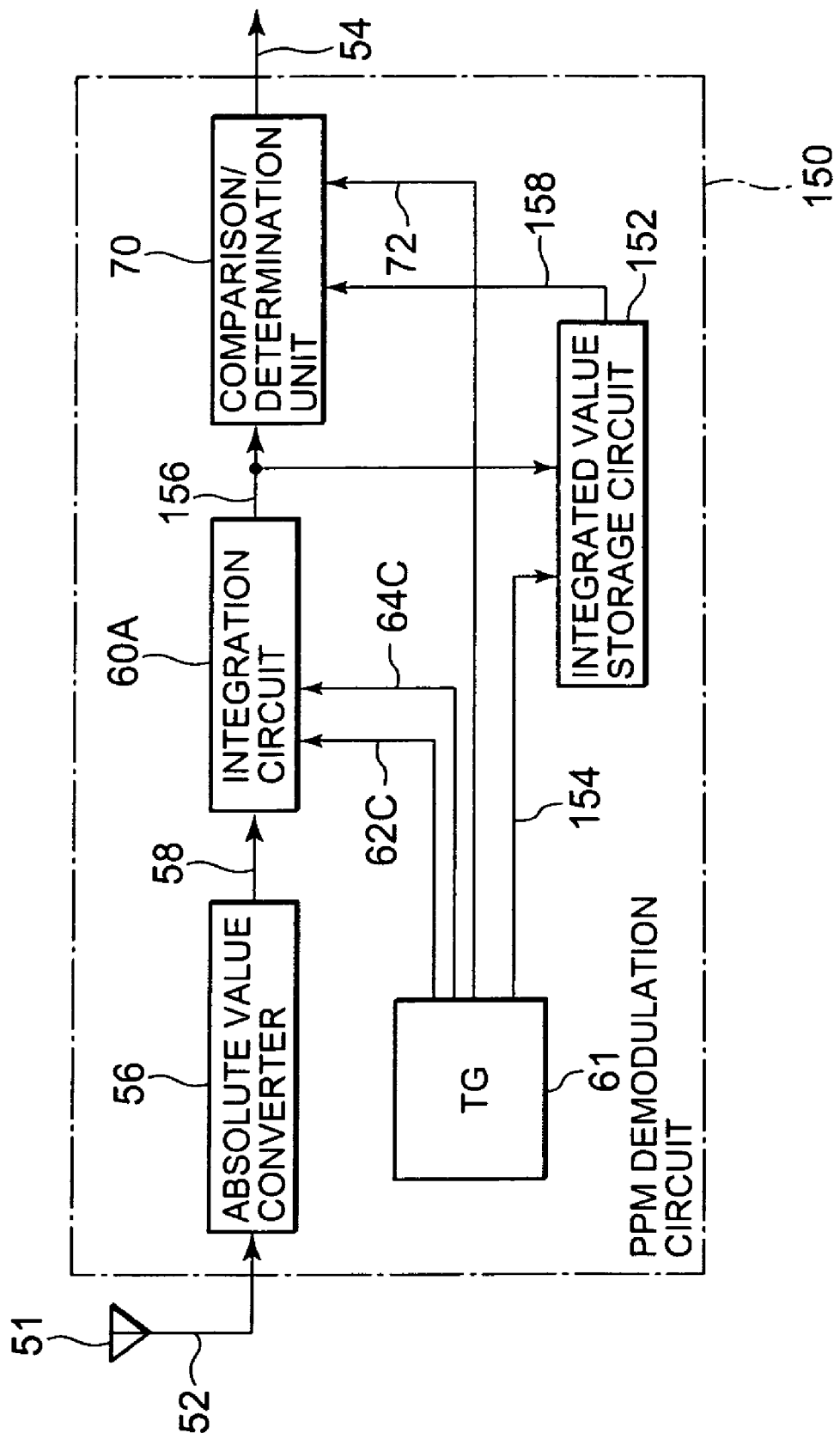
FIG. 16 is a block diagram showing a fifth embodiment of a PPM demodulation determining circuit according to the present invention.

FIG. 16 is a block diagram showing a fifth embodiment of a PPM demodulation determining circuit according to the present invention. The PPM demodulation determining circuit 150 is one wherein one integration circuit of the PPM demodulation determining circuit shown in FIG. 7 is substituted with an integrated value storage circuit 152. The integrated value storage circuit 152 is a circuit which temporarily holds or stores a value outputted from an integration circuit 60A. While the value outputted from the integration circuit 60A changes momentarily when its integration is done, the integrated value storage circuit 152 is capable of saving or storing an output value at the turning ON of a storage control signal 154 in accordance with the storage control signal 154 (ON/OFF) supplied from a timing generator 61. When the storage control signal 154 is brought to OFF, the integrated value storage circuit 152 discharges the stored integrated value.

Figure 17:
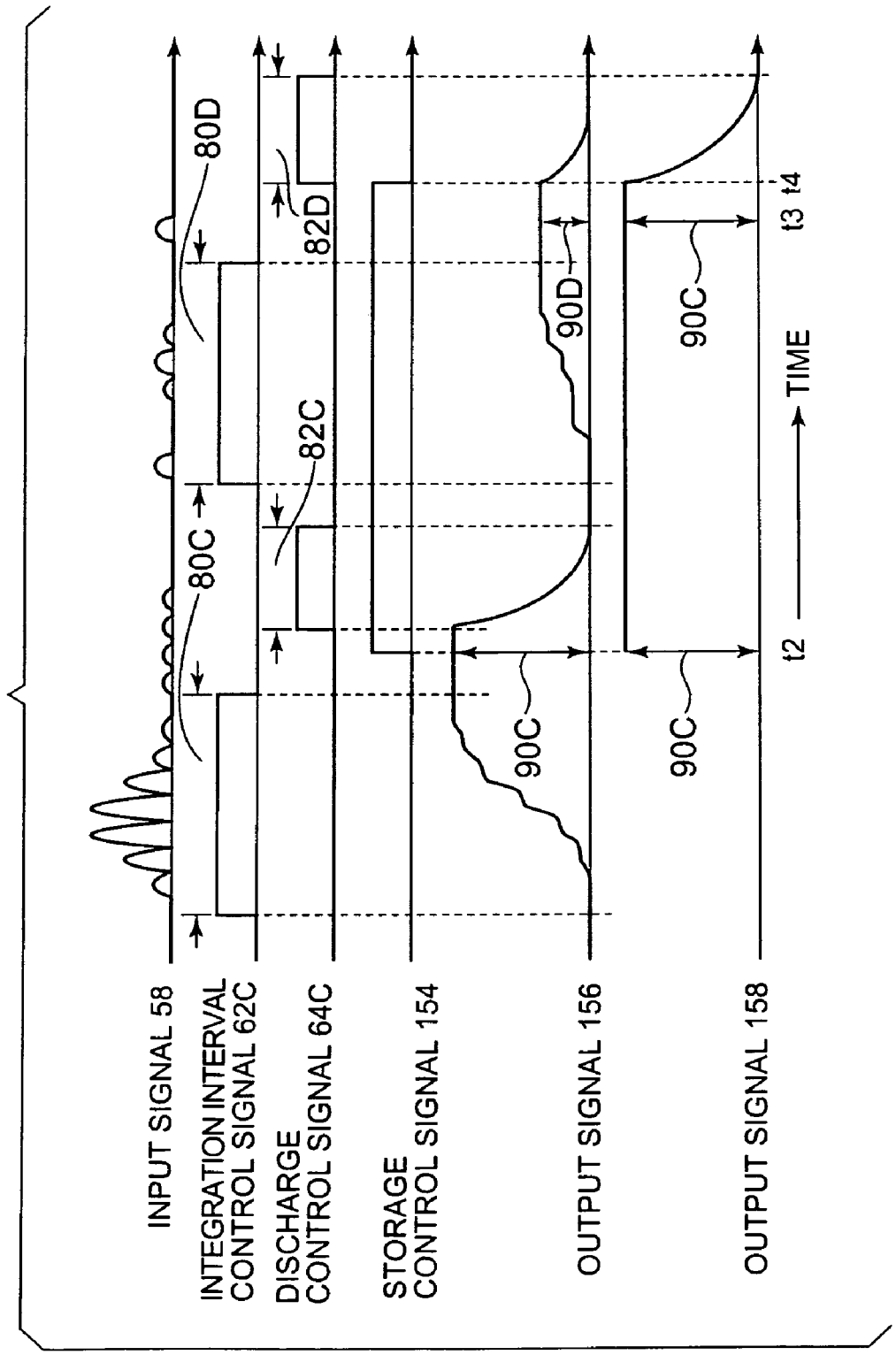
FIG. 17 is an example illustrative of input/output signals of an integration circuit shown in FIG. 16.

The embodiment of the PPM demodulation determining circuit according to the present invention, which has the above configuration, is operated as follows. FIG. 17 is an example illustrative of input/output signals of the integration circuit shown in FIG. 16. As shown in FIG. 17, the integration circuit 60A integrates an input signal 58 during integration times 80C and 80D determined by an integration time control signal 62C supplied from the timing generator 61 and discharges the integrated signal components during discharge times 82C and 82D determined by a discharge control signal 64C. Thus, in the embodiment shown in FIG. 16, the integrations/discharges respectively carried out by the two integration circuits in FIG. 7, are performed by one integration circuit 60A.

On the other hand, since the storage control signal 154 is turned ON in a timing t2 provided for the interval from after the first integration time 80C is ended and the first discharge time 82C is started, the integrated value storage circuit 152 stores a signal 156, i.e., an amplitude 90C outputted from the integration circuit 60A. The amplitude 90C is stored as an output signal 158 of the integrated value storage circuit 152 during an arbitrary time interval up to the turning OFF of the storage control signal 154.

A comparison/determination unit 70 compares the amplitudes of the output signals 156 and 158 between the completion of a second integration time 80D at the integrated value storage circuit 152 and the start of a second discharge time 82D. Thus, a decision is made as to in which integration time a pulse signal exists. A timing t3 for amplitude comparison is supplied to the comparison/determination unit 70 by a decision timing signal 72. The comparison/determination circuit 70 compares and determines amplitudes 90D and 90C of the output signals 156 and 158 shown in FIG. 17. Thus, in the present embodiment, the value firstly integrated by the integration circuit 60A is stored in the integrated value storage circuit 152 and compared with the value subsequently integrated by the integration circuit 60A, whereby an effect similar to the first embodiment is obtained.

Incidentally, while the integration/discharge process step is being repeated twice alone, the process step may be repeated three or more times by increasing the number of integrated value storage circuits. In such a case, one or more integrated value storage circuits respectively corresponding to process steps excluding a process step corresponding to the last or final time, of a plurality of times of process steps are provided, and the output signal of the integration circuit may be stored in timing determined between the integration time and the discharge time in the corresponding process step. Then, the comparison/determination unit 70 compares the output signal of the integration circuit 60A and the output signals of the respective integrated value storage circuits in timing (equivalent to a timing t3 in FIG. 17) determined between an integration time and a discharge time in the final process step. Thereafter, a decision may be made as to in which output signal a pulse position-modulated signal exists.

Figure 18:
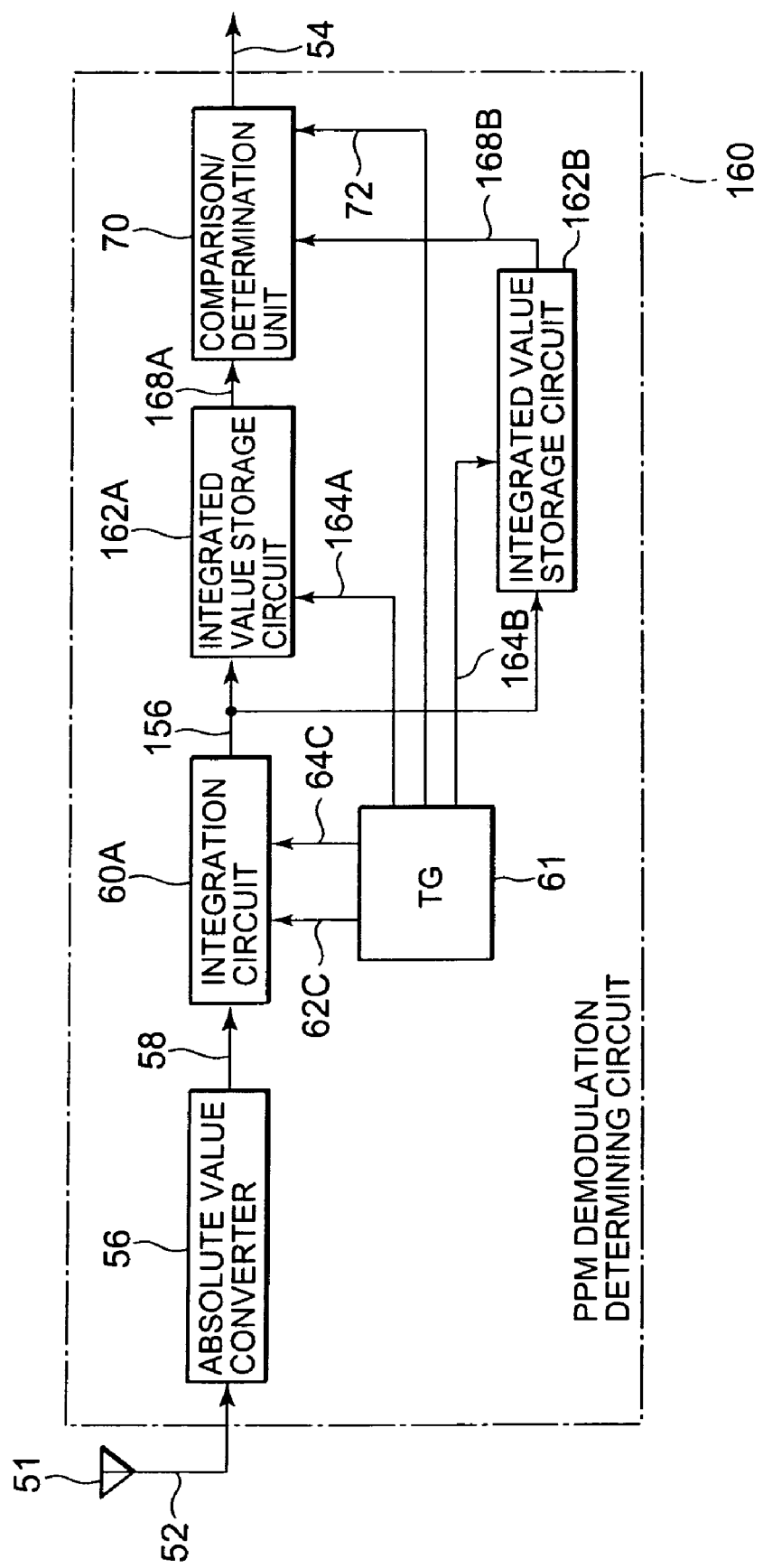
FIG. 18 is a block diagram showing a sixth embodiment of a PPM demodulation determining circuit according to the present invention.

FIG. 18 is a block diagram showing a sixth embodiment of a PPM demodulation determining circuit according to the present invention. Comparing the PPM demodulation determining circuit 160 with the embodiment shown in FIG. 16, the present embodiment is different from the embodiment shown in FIG. 16 in that two integrated value storage circuits each of which temporarily stores a value outputted from an integration circuit, are provided. These two integrated value storage circuits 162A and 162B are connected to an output terminal 156 of the integration circuit 60A. Further, output terminals 168A and 168B of the two integrated value storage circuits 162A and 162B are connected to a comparison/determination unit 70.

The embodiment of the PPM demodulation determining circuit according to the present invention, which has the above configuration, is operated as follows. In a manner similar to the embodiment shown in FIG. 16, the integration/discharge is performed twice by one integration circuit 60A. The present embodiment is different from the embodiment shown in FIG. 16 in that the second integrated value is also stored in the integrated value storage circuit 162B as well as the storage of the first integrated value in the integrated value storage circuit 162A. Then, the comparison/determination unit 70 determines integrated values obtained from their corresponding outputs 168A and 168B of the two integrated value storage circuits 162A and 162B by their comparison. The present embodiment obtains an effect similar to the first embodiment in this way.

Comparing the present embodiment with the embodiment shown in FIG. 16, the comparison between the integrated values is performed based on the output of the integration circuit and the output of the integrated value storage circuit in FIG. 16. Hence the integrated value storage circuit must store the integrated value delivered from the integration circuit and output the same value therefrom as it is. In the present embodiment, however, it is not necessary to output the values of two input signals inputted to the integrated value storage circuits 162A and 162B in their corresponding individual timings, as they are. Values obtained by multiplying the values thereof by the same constant by means of the integrated value storage circuits 162A and 162B may be outputted. That is, the ratio between the input signals may be used for comparison/determination.

Incidentally, although the two integrated value storage circuits 162A and 162B are provided to make a comparison between the results of two integrations in the present embodiment, the number of integrated value storage circuits may be increased to greater than or equal to three where they are used in a PPM system for making a comparison between the results of three or more integrations. In such a case, the plurality of integrated value storage circuits respectively correspond to a plurality of times of integration/discharge process steps. Then, the output signal of the integration circuit may be stored with timing determined between an integration time and a discharge time in the corresponding process step. The comparison/determination unit 70 compares the output signals of the respective integrated value storage circuits and determines whether a pulse position-modulated signal exists in any output signal.

Figure 19:
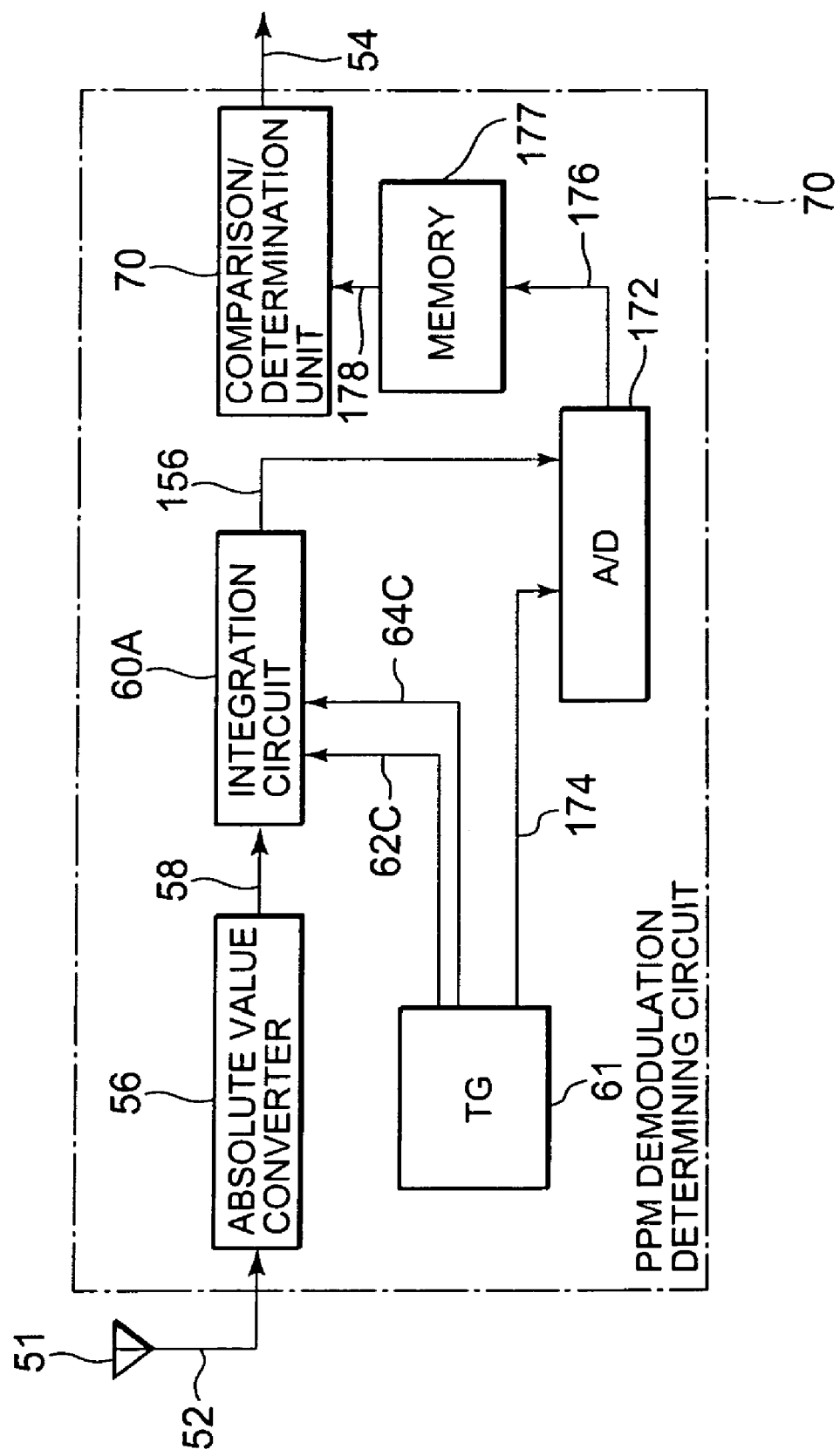
FIG. 19 is a block diagram showing a seventh embodiment of a PPM demodulation determining circuit according to the present invention.

FIG. 19 is a block diagram showing a seventh embodiment of a PPM demodulation determining circuit according to the present invention. The PPM demodulation determining circuit 170 is equivalent to one configured by substituting the integrated value storage circuit according to the embodiment shown in FIG. 16 with an A/D (Analogue-Digital) converter and a memory. The A/D converter 172 is a circuit which is connected to an output terminal 156 of an integration circuit 60A and which samples a value outputted from the integration circuit 60A at a desired point of time and converts it into a digital signal. Timing for its sampling is determined by a sampling signal 174 supplied from a timing generator 61. Described specifically, sampling is carried out during a period from an integration time to a discharge time in respective integration/discharge process steps performed by the integration circuit 60A. The memory 177 is capable of storing a value 176 sampled by the A/D converter 172 as a digital signal. If sampling is done plural times, then a plurality of integrated values are stored in the memory 177.

The embodiment of the PPM demodulation determining circuit according to the present invention, which has the above configuration, is operated as follows. In a manner similar to the embodiment shown in FIG. 16 or 18, the integration/discharge is carried out twice by one integration circuit 60A. Then, when the first integration is completed, the A/D converter 172 is supplied with a sampling signal 174. Thus, the A/D converter 172 A/D—converts the integrated value and stores the converted value in the memory 177. After the completion of discharge by the integration circuit 60A, sampling is performed again when the second integration is ended, and the sampled integrated value is stored in the memory 177. Then, the comparison/determination unit 70 determines the two digital integrated values stored in the memory 177 by their comparison. The present embodiment obtains an effect similar to the first embodiment in this way.

The characteristic of the present embodiment is different from other embodiments and resides in that the comparison and determination are carried out using the integrated values converted into the digital signals. In the present embodiment, the sampling and storage of the integrated values can be carried out any number of times by supplying the sampling signal 174 to the A/D converter 174. Thus, the present embodiment has the advantage of being able to cope with or adapt to three or more integrations by virtue of one memory 177 capable of storing the digital signal without increasing the number of integrated value storage circuits each storing such an analog signal as shown in FIG. 18.

Figure 20:
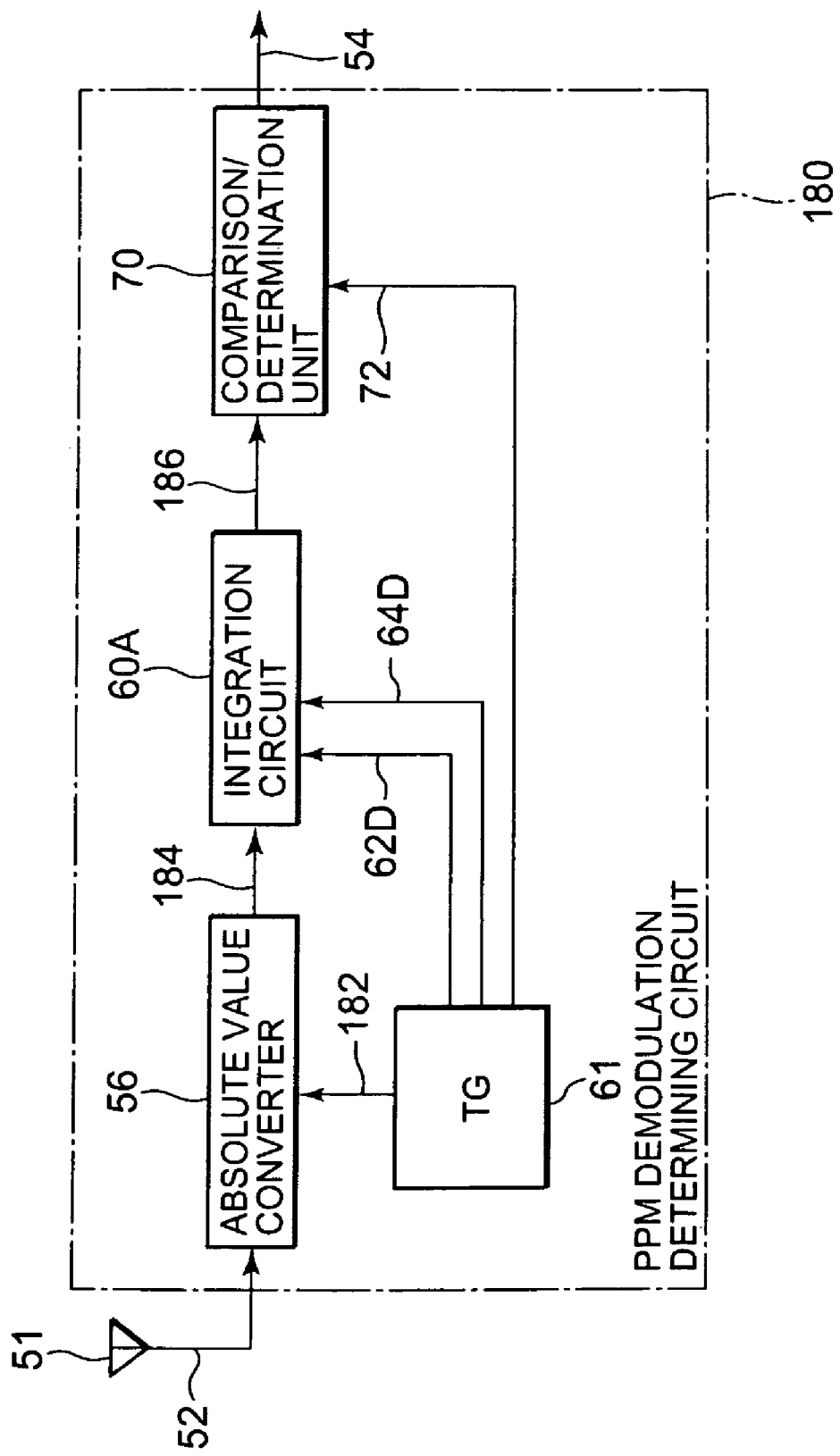
FIG. 20 is a block diagram showing an eighth embodiment of a PPM demodulation determining circuit according to the present invention.

FIG. 20 is a block diagram showing an eighth embodiment of a PPM demodulation determining circuit according to the present invention. The PPM demodulation determining circuit 180 does not have elements like other integration circuit, integrated value storage circuit, A/D converter and memory except for having one integration circuit 60A. However, the integration circuit 60A is inputted with a polarity control signal 182 capable of controlling its output polarity direction, from a timing generator 61. The polarity control signal 182 (ON/OFF) is a signal for inverting the polarity of a signal subjected to absolute value conversion. Although all signals outputted from an absolute value converter 56 have positive polarities normally, i.e., during a period in which the polarity control signal 182 is held OFF, a signal inverted to a negative polarity is outputted during a period in which the polarity control signal 182 is held ON.

Figure 21:
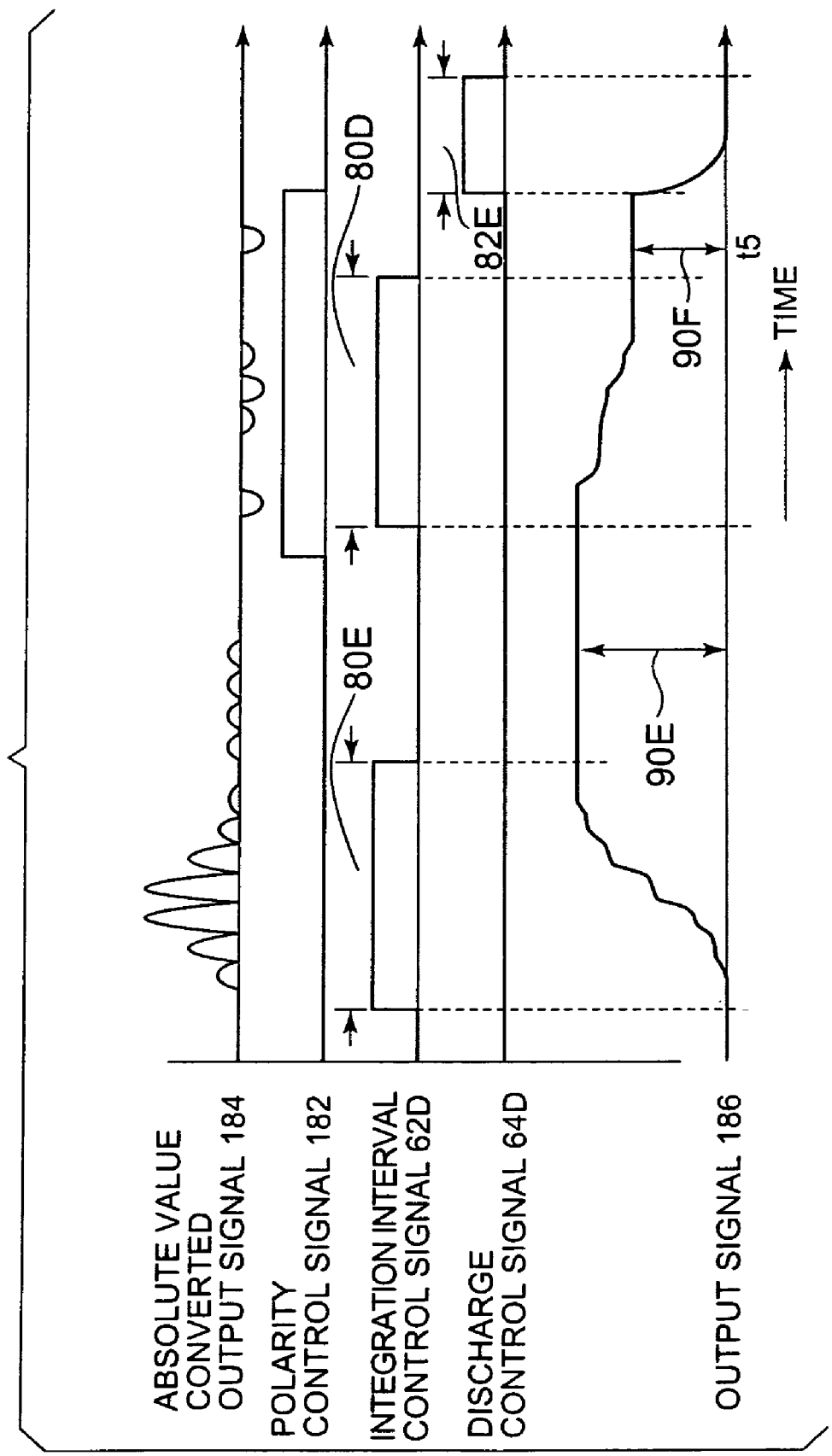
FIG. 21 is an example illustrative of input/output signals of an integration circuit shown in FIG. 20.

The embodiment of the PPM demodulation determining circuit according to the present invention, which has the above configuration, is operated as follows. FIG. 21 is an example illustrative of input/output signals of the integration circuit shown in FIG. 20. The integration circuit 60A firstly carries out a first integration during an integration time 80E determined by an integration time control signal 62D supplied from the timing generator 61 as shown in FIG. 20. In the present embodiment, the integration circuit 60A performs a second integration during an integration time 80F after the first integration without performing discharge. After the second integration, the integration circuit 60A first discharges the integrated signal component during a discharge time 82E determined by a discharge control signal 64D. Since, at this time, the polarity control signal 182 is brought to ON and hence the polarity of a signal 184 becomes negative during at least an integration time 80F at the second time, an amplitude 90E obtained as a result of the first integration is reduced to an amplitude 90F as a result of the second integration.

Then, a comparison/determination unit 70 receives the amplitude 90F as an output 186 sent from the integration circuit 60A in a timing t5. Since the amplitude 90F has a positive value, it is understood that the first integrated value positive in polarity is larger than the second integrated value negative in polarity If the amplitude 90F has a negative value, it is understood that the second integrated value negative in polarity is large. After such a decision, the integration circuit 60A performs discharge during the discharge time 82E in accordance with the discharge control signal 64D.

Thus, in the present embodiment, the difference between the first and second integrated values is outputted from the integration circuit, and a decision is made as to in which integration time a pulse signal exists, based on the polarity of the difference. Either signal at the first and second integrations may be used to invert the polarity at the absolute value converter 56. Keeping on integrating in succession using the single integration circuit enables even comparison/determination in the present embodiment, and hence an effect similar to the first embodiment is obtained.

Figure 22:
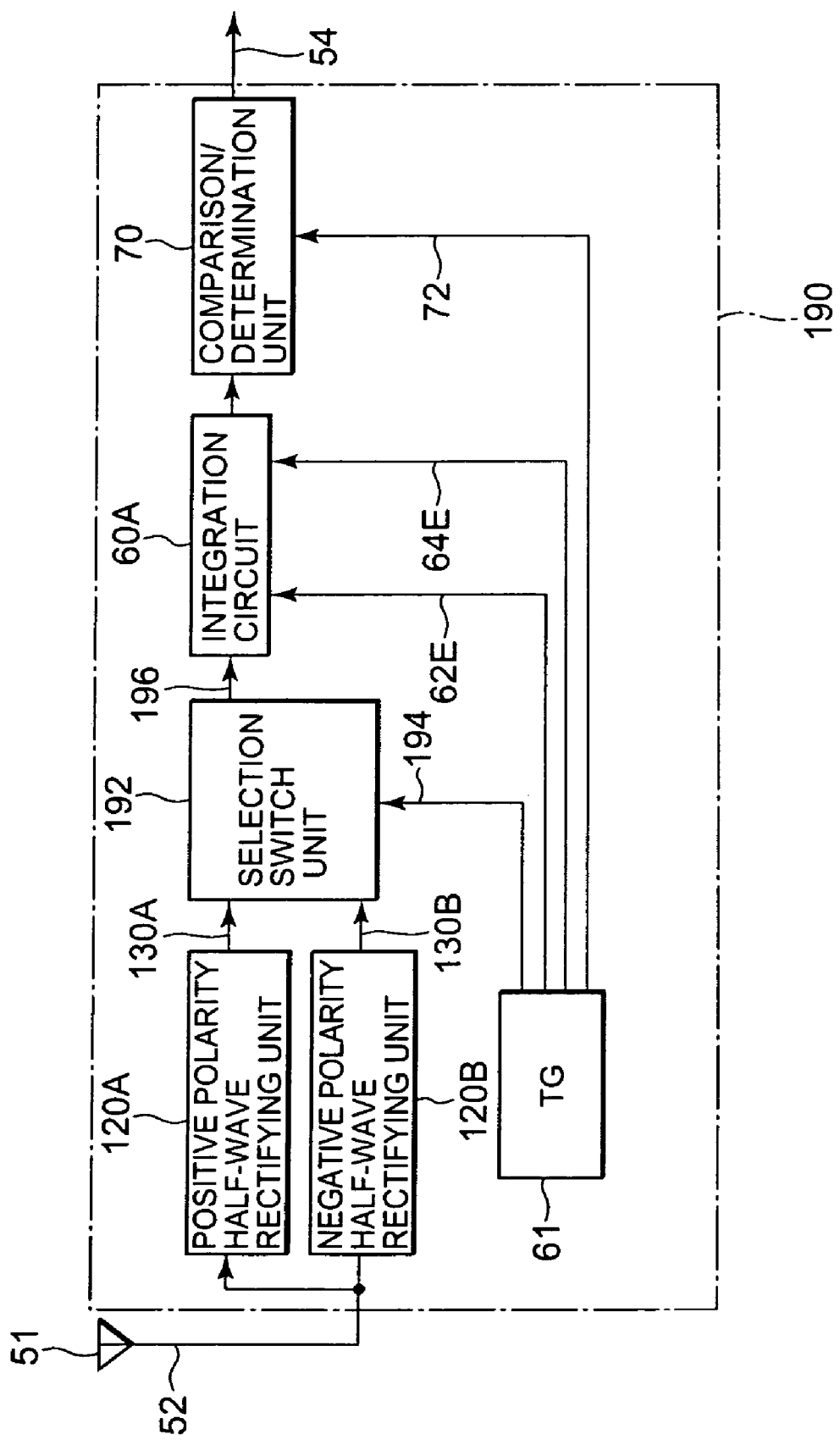
FIG. 22 is a block diagram showing a ninth embodiment of a PPM demodulation determining circuit according to the present invention.

FIG. 22 is a block diagram showing a ninth embodiment of a PPM demodulation determining circuit according to the present invention. The PPM demodulation determining circuit 190 includes two half-wave rectifying units 120A and 120B in a manner similar to FIG. 14. The present embodiment is different from FIG. 14 in that a selector or selection switch unit 192 is provided which is connected to output terminals 130A and 130B of these half-wave rectifying units 120A and 120B and selects either one of their outputs. The selection switch unit 192 is connected to a timing generator 61 and receives a polarity control signal 194 (ON/OFF) from the timing generator 61.

As described in FIG. 20, the polarity control signal 194 is a signal which inverts the polarity of each signal. However, the polarity control signal 194 employed in the present embodiment not only inverts signal polarity but also serves as a trigger for selection switching. That is, the selection switch unit 192 selects the output of the positive polarity half-wave rectifying unit 120A during a period in which the polarity control signal 194 is held OFF. Since the polarity control signal 194 is OFF at this time, the output of the same circuit 120A is not inverted and outputted while remaining held at the positive polarity, followed by being integrated by an integration circuit 60A. On the other hand, the selection switch unit 192 selects the output of the negative polarity half-wave rectifying unit 120B during a period in which the polarity control signal 194 is held ON. Since the polarity control signal 194 is ON at this time, the output of the same rectifying unit 120B is not inverted to the negative polarity and then outputted, followed by being integrated by the integration circuit 60A. Incidentally, although not shown in the figure, the rectifying units 120A and 120B may be supplied with a threshold signal so as to perform rectification with a threshold value regarded as a zero level.

Figure 23:
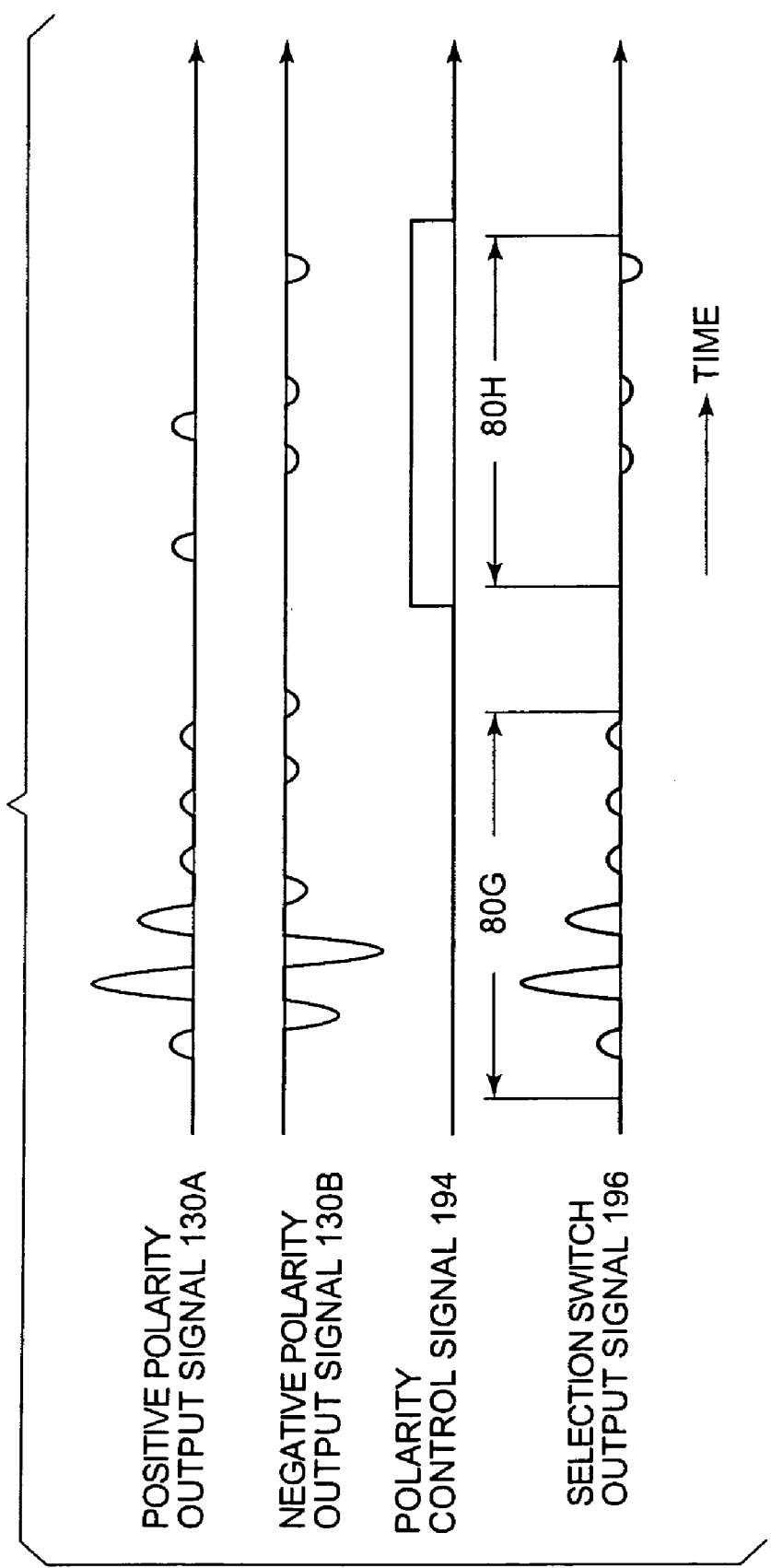
FIG. 23 is an example illustrative of output signals of positive polarity/negative polarity half-wave rectifying units and a selection switch unit shown in FIG. 22.

The embodiment of the PPM demodulation determining circuit according to the present invention, which has the above configuration, is operated as follows. FIG. 23 is an example illustrative of output signals of the positive polarity/negative polarity half-wave rectifying units 120A and 120b and selection switch unit 192 shown in FIG. 22. The output signals 130A and 130B of the positive polarity/negative polarity half-wave rectifying units 120A and 120B are represented as shown in the figure. As has been described even in FIG. 15, the signal 130B appears on the negative polarity side but is no more than represented so for convenience of illustration. Since the input signal 52 is actually inverted and rectified, a signal having a similar absolute value appears on the positive polarity side.

Since the polarity control signal 194 is OFF in the first half of FIG. 23, the selection switch unit 192 selects the output signal 130A of the rectifying unit 120A. On the other hand, since the polarity control signal 194 is ON in the latter half of FIG. 23, the selection switch unit 192 selects the output signal 130B of the rectifying unit 120B. During the period in which the polarity control signal 194 is ON, the signal 130B having the positive polarity is inverted, thus resulting in having the negative polarity. As a result, the signal 130A appears while remaining held at the positive polarity in the first half as represented by a selection switch signal 196, whereas the signal 130B appears with being inverted to the negative polarity in the latter half. This signal 196 is integrated by the integration circuit 60A.

The integration circuit 60A integrates, as a first integration, the signal 130A having the positive polarity during an integration time 80G which belongs to a time zone in which the polarity control signal 194 is held OFF. Thereafter, the integration circuit 60A performs a second integration during an integration time 80H without performing discharge. Since the polarity control signal 194 is ON and the polarity of the signal 130B becomes negative during at least an integration time 80H at the second integration, the amplitude obtained as a result of the first integration becomes small as a result of the second integration in a manner similar to the output signal 186 shown in FIG. 21.

Then, the difference between the integrated values at the first and second integrations is outputted from the integration circuit in a manner similar to the embodiment shown in FIG. 20 even in the present embodiment. A comparison/determination unit 70 makes a decision as to in which integration time a pulse signal exists, based on the polarity of the difference.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

DRAWINGS

FIG. 1
FIRST EMBODIMENT OF MODULATOR USING DELAYER
   10 . . . MODULATOR, 12 . . . PULSE GENERATOR, 14 . . . DELAYER FILTER

FIG. 2
DELAYER FILTER
   30 . . . GAIN ADJUSTMENT UNIT
   d1 . . . HIGH FREQUENCY DELAYER, d2 . . . HIGH FREQUENCY DELAYER, d3 . . . HIGH FREQUENCY DELAYER, dn−1 . . . HIGH FREQUENCY DELAYER

FIG. 3
EXAMPLE ILLUSTRATIVE OF GAIN VALUES OF VARIABLE GAINERS

FIG. 4
EXAMPLE ILLUSTRATIVE OF INPUT/OUTPUT OF DELAY FILTER
18 . . . INPUT SIGNAL
OUTPUT FROM a1
OUTPUT FROM a2
OUTPUT FROM a3
OUTPUT FROM a4
OUTPUT FROM a5
OUTPUT FROM an
22 . . . OUTPUT SIGNAL

FIG. 5
SECOND EMBODIMENT OF MODULATOR USING DELAYER
40 . . . MODULATOR, 12 . . . PULSE GENERATOR, 14 . . . DELAYER FILTER, 42 . . . DIFFERENTIATION CIRCUIT

FIG. 6
EXAMPLE ILLUSTRATIVE OF INPUT/OUTPUT OF DIFFERENTIATION CIRCUIT
18 . . . INPUT SIGNAL, 44 . . . OUTPUT SIGNAL

FIG. 7
FIRST EMBODIMENT OF PPM DEMODULATION DETERMINING CIRCUIT
   50 . . . PPM DEMODULATION DETERMINING CIRCUIT, 56 . . . ABSOLUTE VALUE CONVERTER, 60A . . .

INTEGRATION CIRCUIT, 60B ... INTEGRATION CIRCUIT, 70 ... COMPARISON/DETERMINATION UNIT

FIG. 8
EXAMPLE ILLUSTRATIVE OF INPUT/OUTPUT OF ABSOLUTE VALUE CONVERTER
52 ... INPUT SIGNAL, 58 ... OUTPUT SIGNAL

FIG. 9
EXAMPLE ILLUSTRATIVE OF INPUT/OUTPUT OF INTEGRATION CIRCUIT
58 ... INPUT SIGNAL, 62A ... INTEGRATION INTERVAL CONTROL SIGNAL, 62B ... INTEGRATION INTERVAL CONTROL SIGNAL, 64A ... DISCHARGE CONTROL SIGNAL, 64B ... DISCHARGE CONTROL SIGNAL, 66A ... OUTPUT SIGNAL, 66B ... OUTPUT SIGNAL

FIG. 10
SECOND EMBODIMENT OF PPM DEMODULATION DETERMINING CIRCUIT
56B ... ABSOLUTE VALUE CONVERTER, 60A ... INTEGRATION CIRCUIT, 60B ... INTEGRATION CIRCUIT, 70 ... COMPARISON/DETERMINATION UNIT

FIG. 11
INPUT/OUTPUT OF ABSOLUTE VALUE CONVERTER USING THRESHOLD VALUE
52 ... INPUT SIGNAL, 58B ... OUTPUT SIGNAL

FIG. 12
THIRD EMBODIMENT OF PPM DEMODULATION DETERMINING CIRCUIT
60A ... INTEGRATION CIRCUIT, 60B ... INTEGRATION CIRCUIT, 70 ... COMPARISON/DETERMINATION UNIT, 120 ... HALF-WAVE RECTIFYING UNIT

FIG. 13
EXAMPLE ILLUSTRATIVE OF INPUT/OUTPUT OF HALF-WAVE RECTIFYING UNIT
52 ... INPUT SIGNAL, 58C ... OUTPUT SIGNAL

FIG. 14
FOURTH EMBODIMENT OF PPM DEMODULATION DETERMINING CIRCUIT
60A ... INTEGRATION CIRCUIT, 60B ... INTEGRATION CIRCUIT, 60C ... INTEGRATION CIRCUIT, 60D ... INTEGRATION CIRCUIT, 70 ... COMPARISON/DETERMINATION UNIT, 120A ... POSITIVE POLARITY HALF-WAVE RECTIFYING UNIT, 120B ... NEGATIVE POLARITY HALF-WAVE RECTIFYING UNIT

FIG. 15
EXAMPLE ILLUSTRATIVE OF INPUT/OUTPUT OF POSITIVE POLARITY/NEGATIVE POLARITY HALF-WAVE RECTIFYING UNITS
52 ... INPUT SIGNAL, 130A ... POSITIVE POLARITY OUTPUT SIGNAL, 130B ... NEGATIVE POLARITY OUTPUT SIGNAL

FIG. 16
FIFTH EMBODIMENT OF PPM DEMODULATION DETERMINING CIRCUIT
56 ... ABSOLUTE VALUE CONVERTER, 60A ... INTEGRATION CIRCUIT, 70 ... COMPARISON/DETERMINATION UNIT, 150 ... M DEMODULATION DETERMINING CIRCUIT, 152 ... INTERGRATED VALUE STORAGE CIRCUIT

FIG. 17
EXAMPLE ILLUSTRATIVE OF INPUT/OUTPUT OF INTEGRATION CIRCUIT
58 ... INPUT SIGNAL, 62C ... INTEGRATION INTERVAL CONTROL SIGNAL, 64C ... DISCHARGE CONTROL SIGNAL, 154 ... STORAGE CONTROL SIGNAL, 156 ... OUTPUT SIGNAL, 158 ... OUTPUT SIGNAL

FIG. 18
SIXTH EMBODIMENT OF PPM DEMODULATION DETERMINING CIRCUIT
56 ... ABSOLUTE VALUE CONVERTER, 60A ... INTERGRATION CIRCUIT, 70 ... COMPARISON/DETERMINATION UNIT, 160 ... PPM DEMODULATION DETERMINING CIRCUIT, 162A ... INTEGRATED VALUE STORAGE CIRCUIT, 162B ... INTEGRATED VALUE STORAGE CIRCUIT

FIG. 19
SEVENTH EMBODIMENT OF PPM DEMODULATION DETERMINING CIRCUIT
56 ... ABSOLUTE VALUE CONVERTER, 60A ... INTERGRATION CIRCUIT, 70 ... COMPARISON/DETERMINATION UNIT, 170 ... PPM DEMODULATION DETERMINING CIRCUIT, 177 ... MEMORY

FIG. 20
EIGHTH EMBODIMENT OF PPM DEMODULATION DETERMINING CIRCUIT
56 ... ABSOLUTE VALUE CONVERTER, 60A ... INTEGRATION CIRCUIT, 70 ... COMPARISON/DETERMINATION UNIT, 180 ... PPM DEMODULATION DETERMINING CIRCUIT

FIG. 21
EXAMPLE ILLUSTRATIVE OF OUTPUT OF INTEGRATION CIRCUIT
184 ... ABSOLUTE VALUE CONVERTED OUTPUT SIGNAL, 182 ... POLARITY CONTROL SIGNAL, 62D ... INTEGRATION INTERVAL CONTROL SIGNAL, 64D ... DISCHARGE CONTROL SIGNAL, 186 ... OUTPUT SIGNAL

FIG. 22
NINTH EMBODIMENT OF PPM DEMODULATION DETERMINING CIRCUIT
60A ... INTEGRATION CIRCUIT, 70 ... COMPARISON/DETERMINATION UNIT, 120A ... POSITIVE POLARITY HALF-WAVE RECTIFYING UNIT, 120B ... NEGATIVE POLARITY HALF-WAVE RECTIFYING UNIT, 192 ... SELECTION SWITCH UNIT

FIG. 23
EXAMPLE ILLUSTRATIVE OF OUTPUTS OF POSITIVE POLARITY HALF-WAVE RECTIFYING UNIT, NEGATIVE POLARITY HALF-WAVE RECTIFYING UNIT AND SELECTION SWITCH UNIT
130A ... POSITIVE POLARITY HALF-WAVE RECTIFIED OUTPUT SIGNAL, 130B ... NEGATIVE POLARITY HALF-WAVE RECTIFIED OUTPUT SIGNAL, 194 ... POLARITY CONTROL SIGNAL, 196 ... SELECTION SWITCH OUTPUT SIGNAL

What is claimed is:
1. A pulse modulator comprising:
differentiating means which differentiates an input pulse to change a waveform thereof;
at least one or more delay means connected in series, said delay means delaying an output pulse of the differentiating means by delay characteristics provided over a UWB pass bandwidth;
amplifying means which amplify input or output pulses of the respective delay means by variable gains; and adding means which adds the output pulses of the respective amplifying means and outputs the result of addition therefrom, whereby an arbitrary pulse waveform is generated based on the result of the addition by the adding means.

2. The pulse modulator according to claim 1, wherein the length of lines extending from respective delay means to the adding means are adjusted in such a manner that delay times produced between the inputs of the respective delay means and the output of the adding means become constant substantially; and wherein each of the substantially constant delay times is assumed to be less than one-half the time width of a pulse having a highest frequency in the UWB pass bandwidth.

* * * * *